(12) United States Patent
Gallinet et al.

(10) Patent No.: US 11,506,538 B2
(45) Date of Patent: Nov. 22, 2022

(54) OPTICAL FILTER, OPTICAL FILTER SYSTEM, SPECTROMETER AND METHOD OF FABRICATION THEREOF

(71) Applicant: CSEM Centre Suisse d'Electronique et de Microtechnique SA—Recherche et Developpement, Neuchatel (CH)

(72) Inventors: Benjamin Gallinet, Pratteln (CH); Giorgio Quaranta, Saint-Louis (FR); Guillaume Basset, Huningue (FR)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 608 days.

(21) Appl. No.: 16/551,935

(22) Filed: Aug. 27, 2019

(65) Prior Publication Data

US 2020/0064195 A1 Feb. 27, 2020

(30) Foreign Application Priority Data

Aug. 27, 2018 (EP) .................................. 18190990

(51) Int. Cl.
*G01J 3/51* (2006.01)
*G02B 5/20* (2006.01)
*G01J 3/28* (2006.01)

(52) U.S. Cl.
CPC . *G01J 3/51* (2013.01); *G01J 3/28* (2013.01); *G02B 5/201* (2013.01); *G02B 5/208* (2013.01)

(58) Field of Classification Search
CPC .... G01J 3/51; G01J 3/28; G02B 5/201; G02B 5/208
See application file for complete search history.

(56) References Cited

U.S. PATENT DOCUMENTS

| 5,726,805 A * | 3/1998 | Kaushik | G02B 5/201 |
| | | | 359/590 |
| 2008/0135739 A1* | 6/2008 | Kim | G01J 3/513 |
| | | | 250/226 |

(Continued)

FOREIGN PATENT DOCUMENTS

| CN | 103245996 B | 11/2015 |
| KR | 20130098651 A | 9/2013 |

OTHER PUBLICATIONS

Search Report issued in European Patent Application No. 18190990 dated Feb. 15, 2019.

(Continued)

*Primary Examiner* — William R Alexander
*Assistant Examiner* — Sharrief I Broome
(74) *Attorney, Agent, or Firm* — Pearne & Gordon LLP

(57) ABSTRACT

A nano-structured optical wavelength transmission filter is provided. The optical filter includes a patterned substrate on which a high refractive index dielectric waveguide is arranged. A low index dielectric layer is arranged on the high refractive index dielectric waveguide, on which an array of metallic nanostructures is arranged. The layers of the optical filter have conformal shapes defined by a patterned surface of the substrate. An optical filter system includes the optical transmission filter and a detector array fixed to the substrate. A spectrometer includes at least one optical transmission filter and/or at least one said optical transmission filter system, and has a spectral resolution of lower than 30 nm for incident light having a wavelength between 300 nm and 790 nm. A method of fabrication of an optical filter, an optical filter system and a spectrometer is also described.

20 Claims, 16 Drawing Sheets

(56) References Cited

U.S. PATENT DOCUMENTS

| | | | |
|---|---|---|---|
| 2010/0220377 A1* | 9/2010 | Yamada | H01L 27/14621 |
| | | | 359/241 |
| 2014/0071532 A1 | 3/2014 | Ye et al. | |
| 2017/0023711 A1* | 1/2017 | Jiang | G02B 5/1842 |
| 2018/0190673 A1* | 7/2018 | Wang | G02B 5/1819 |
| 2019/0018188 A1* | 1/2019 | Lee | G01J 1/0492 |
| 2020/0089046 A1* | 3/2020 | Li | G02F 1/133516 |

OTHER PUBLICATIONS

Liang, Yuzhang, et al., "Free-standing plasmonic metal-dielectric-metal bandpass filter with high transmission efficiency", Scientific Reports, Jun. 28, 2017, vol. 7, No. 1, XP055556802.

Miazulquim, Daniel B., et al., "Efficient band-pass color filters enabled by resonant modes and plasmons near the Rayleigh anomaly", Optics Express, Dec. 4, 2014, p. 30843, vol. 22, No. 25, XP055557301.

Ebbesen, T.W., et al., "Extraordinary optical transmission through sub-wavelength hole arrays", Letters to Nature, Feb. 12, 1998, pp. 667-669, vol. 391.

Wang, Jiaxing, et al., "Ultra-thin plasmonic color filters incorporating free-standing resonant membrane waveguides with high transmission efficiency", Applied Physics Letters, vol. 110, 031110 (2017).

Lütolf, F., et al., "Fano-resonant aluminum and gold nanostructures created with a tunable, up-scalable process", Nanoscale, 2015, pp. 18179-18187, vol. 7.

\* cited by examiner

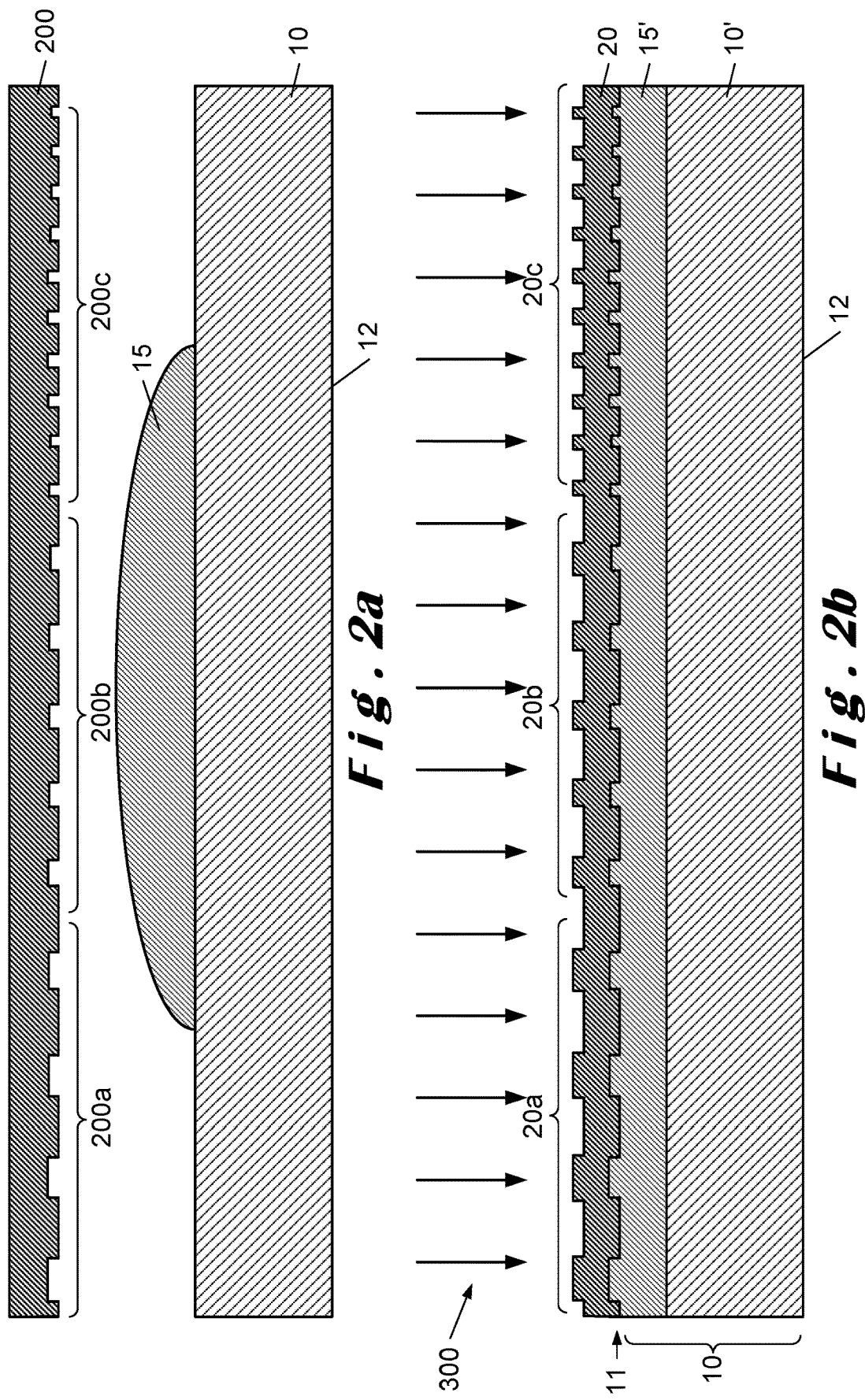

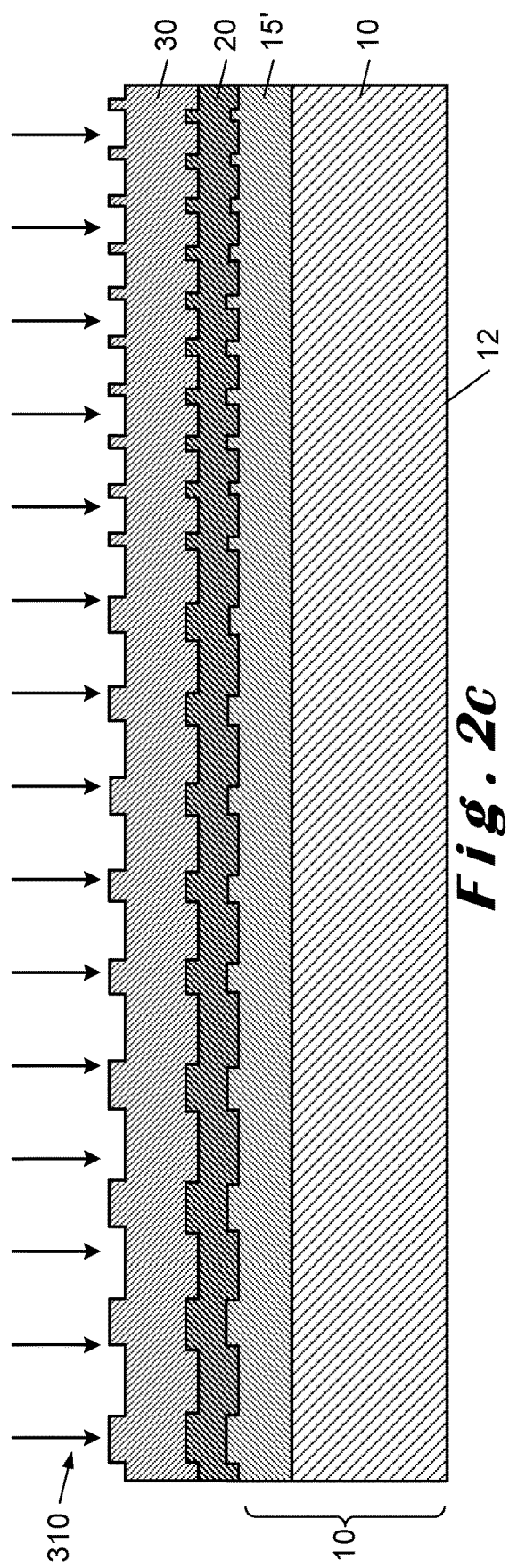
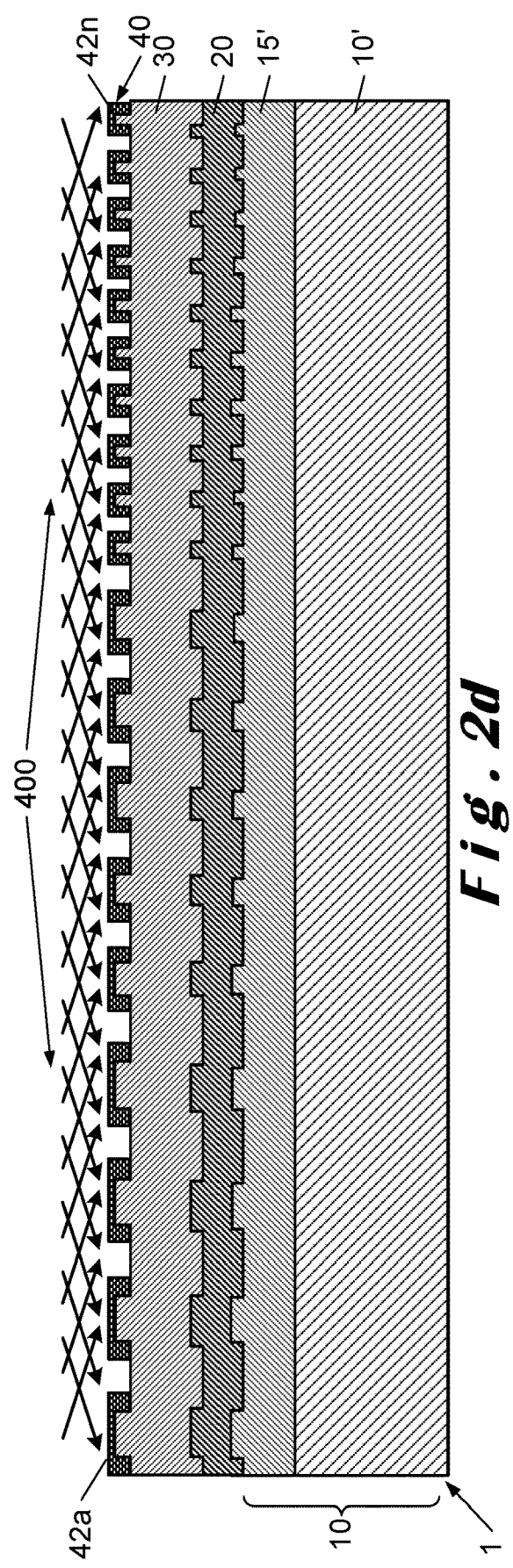

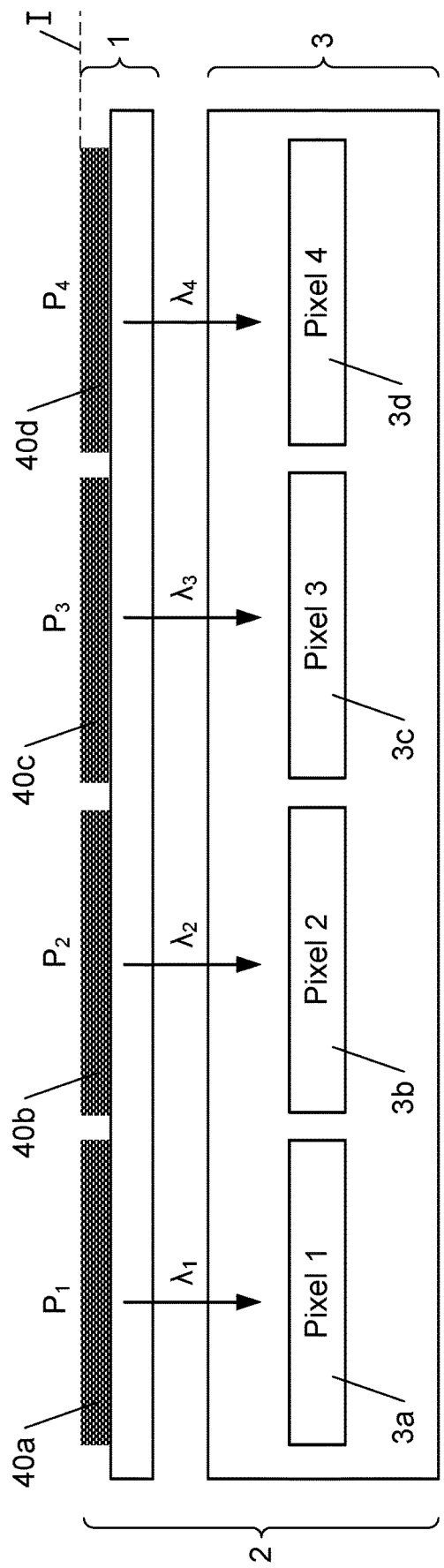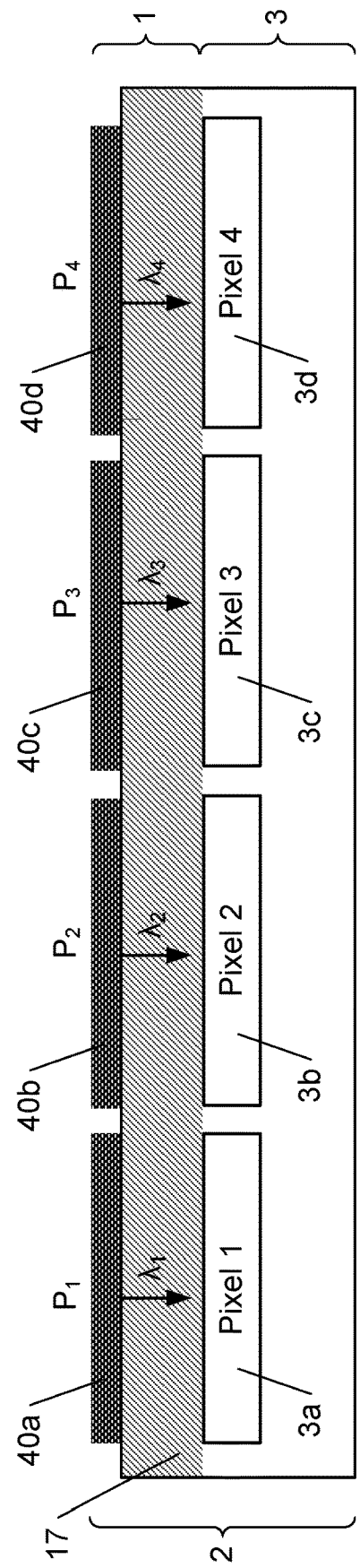

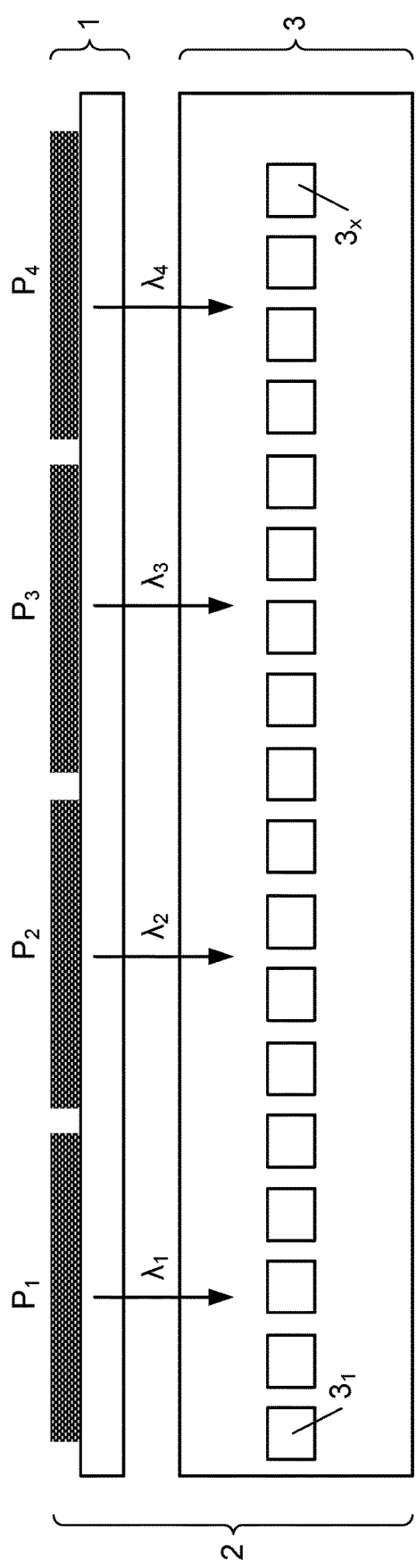
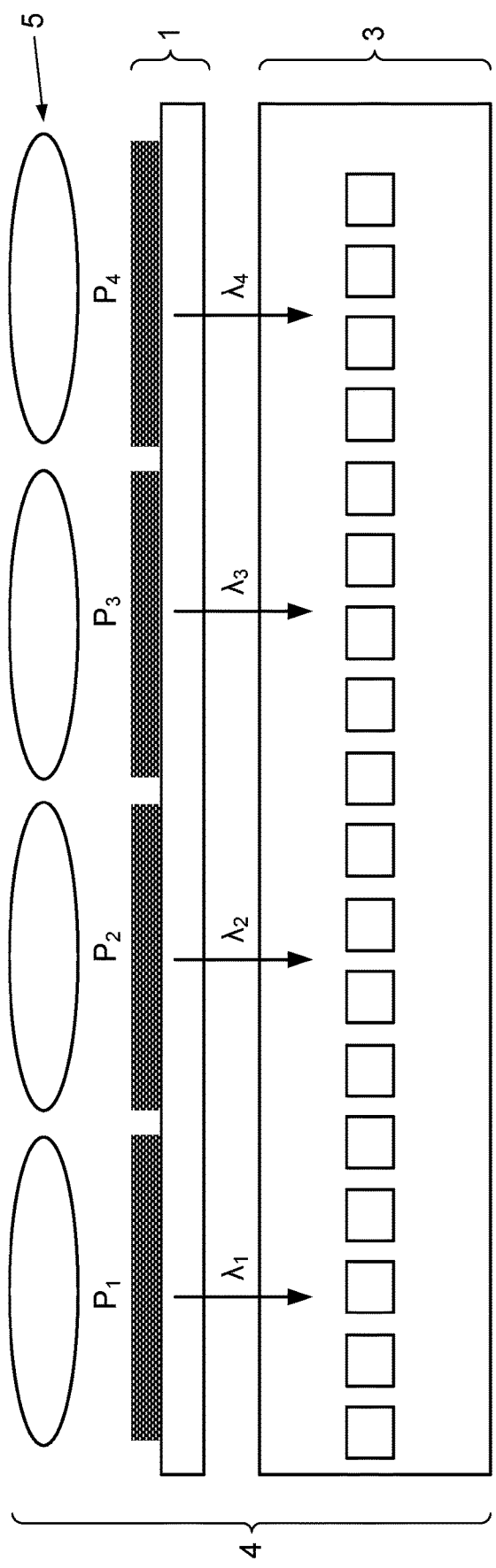

OPTICAL FILTER, OPTICAL FILTER SYSTEM, SPECTROMETER AND METHOD OF FABRICATION THEREOF

TECHNICAL FIELD

The invention relates to the field of transmission optical filters, optical detectors and spectrometers comprising such filters and optical detectors.

More precisely the invention relates to highly transmitting optical filters and such filter arrays having a band-pass with low bandwidth, and comprising a nanostructured substrate and waveguides arranged on such structured substrates. The invention relates also to a miniature spectrometer configured for the market of consumer electronics. The invention encompasses also a method of fabrication of an optical transmission filter having a low bandwidth.

The invention also relates to a method of fabrication of the transmission optical filter and optical detector.

BACKGROUND OF THE ART

The use of optical filters, in particular transmission filters, is important in optical components and optical instruments and systems. For example optical filters combined are often combined with optical detectors, in vision systems such as for example telescopes or in spectroscopes, medical instruments or industrial control and inspection systems. It is indeed useful to have a material or a device that selectively transmits light only in a narrow range of frequencies within a broad spectral range.

Optical transmission filters may be realized in different ways. For example in the far IR (infrared) spectrum filters may be made from wire-mesh or metallic grids. IN the ultraviolet, visible and near-infrared conventional filters may be absorption filters which have in general a very broad transmission spectrum. In order to make transmission filters having a small spectral bandwidth filters may be made by realizing stacks of dielectric thin-films configured as interference filters. Such filters are made up of a great number of layer, typically more than 30, deposited one on the other by vapor deposition techniques for example. The problem with interference based filters is that the wavelength can only be varied by tilting the filter and/or varying the layer thicknesses, which is not only a complex and expensive process, but also makes it difficult to realize an array of different filters side by side within a small dimension.

Optical filters may also be made by thin nanostructured metal layers, in particular metal layers that have arrays of sub-wavelength apertures. Such filters are described in for example the publication by T. W. Ebessen et al. [Ref.1].

In the documents US2012129269 and US2010046077, a sensor based on nanostructured optic filter arrays is disclosed. It consists in a subwavelength array of metallic nanostructures (mainly Al) which transmits a portion of the light spectrum. This approach is interesting because only a variation of the pitch or the fill factor of the nanostructures in the array induces a change of the transmitted color. It enables a fast fabrication with e.g. embossing where the filters are generated all at once. However, the bandwidth is very large due to losses in the metallic structures.

In the document WO2012007147, a bandpass filter based on complementary metallic nanostructures is disclosed. Although this approach has a potential to reduce the bandwidth of plasmonic filters, it still remains large to be competitive of spectrometric or spectral imaging applications.

Mazulquim et al. in Ref. [2] report on a binary Al grating on an $Al_2O_3$ waveguide which filters light in transmission. A variation of the grating pitch leads to a variation of the filter spectral position, which is sought. However, the grating is in direct contact with the waveguide, which leads to a broadening of the transmission band and a relatively high background transmission (20-30%). A related document U.S. Pat. No. 9,081,150 discloses a grating layer, a sublayer of thickness less than 200 nm. The structure disclosed in U.S. Pat. No. 9,081,150 is complex to fabricate as it requires a development and etching step into an Al film to generate the grating.

Wang et al. in Ref. [3] propose to add a low index $MgF_2$ cladding between the Al grating and the waveguide made of $Si_3N_4$. However, the structure is a membrane and is not supported by a substrate, which complicates even more the fabrication. In addition, the fact that the structure is suspended in air, or vacuum, largely increases the bandwidth. A related document CN106896436 presents similar limitations than the filter described in Wang et al.

SUMMARY OF THE INVENTION

It is an objective of the invention to provide an optical transmission filter solving the limitations of prior art optical transmission filters.

To the contrary of purely plasmonic filters, wherein light propagates at the surface of metallic structures, the optical filter of the invention comprises a dielectric waveguide that supports the resonance provided by a nanostructured metallic layer. This reduces considerably the loss of the optical filter and allows also providing an optical filter having a narrow bandwidth, such as for example lower than 20 nm.

Also, to the contrary of other devices of prior art, the optical filter comprises a low index cladding on the waveguide which enable to reduce considerably losses during the propagation of light in the waveguide of the optical filter. Without using a low index cladding it is not possible to reduce the bandwidth of an optical filter that is based on a nanostructured metallic layer.

The filter of the invention is also easy and cheap to fabricate to the contrary of optical transmission filters of prior art that use binary metallic structures which are complex to fabricate, as they need a complex etching step.

More precisely, the invention is achieved by an optical transmission filter, configured to transmit a portion of the spectrum of a light beam incident on said filter, comprising a substrate having a structured first substrate surface and a second substrate surface opposite to said first substrate surface, and comprising also a nanostructured metallic layer and a waveguide arranged between said substrate and said nanostructured metallic layer.

The first substrate surface is a patterned surface comprising a one- or two-dimensional array of nanostructures consisting of adjacent ridges and grooves. A high refractive index dielectric waveguide is arranged on said first substrate surface and has a patterned shape defined by said first substrate surface, said dielectric waveguide having a refractive index $n_1$ between 1.45 and 3.3.

A low index dielectric layer is arranged on top of said dielectric waveguide and has a patterned shape defined by said dielectric waveguide, said patterned shape defining adjacent low index dielectric ridges and grooves said dielectric layer having a refractive index $n_2$ between 1.15 and 1.7, $n_2$ being lower than $n_1$.

An array of metallic nanostructures is arranged on at least a portion of said low index dielectric layer and having, at least partially, a patterned shape defined by said dielectric waveguide The advantage of using a structured metallic payer on top of a waveguide is that light incoupled by diffraction from the structured metallic layer is outcoupled after propagation over a certain length, typically 5 µm, out of the waveguide and interferes with the incident light so that a window of transmission is obtained at resonance.

In an embodiment of the invention said array of metallic nanostructures comprises an array of apertures each of said apertures facing one of the grooves of said low index dielectric layer. The advantage of using apertures in the structured metallic layer is to reduce the full width at half maximum (FWHM) of the transmission band(s) of the filter while keeping a high peak transmission level.

In an embodiment of the invention said array of metallic nanostructures has a non-uniform thickness and has a thickness of the metallic nanostructures on the ridges of said low index dielectric layer that is greater than its thickness on the grooves of said low index dielectric layer. Using a structured metallic layer having portions that have a partial light transmission allows to provide an optical filter that is cheaper to make and allows providing additional design flexibility of the filter.

In an embodiment of the invention said array comprises a plurality of N subarrays having different periodicities $P_1$-$P_N$ in at least one dimension, N being preferably greater than 10. Using a plurality of subarrays allows providing a filter having a plurality of predetermined transmission spectral bands.

In an embodiment of the invention said metallic nanostructures only covers at least a portion of the ridges of said low index dielectric layer.

In an embodiment of the invention said metallic nanostructures only cover at least a portion said grooves. Covering only a portion of the ridges and/or grooves of the low index dielectric layers allows providing a wide range of design alternatives having different transmission properties. The transmission characteristics are also less sensitive to fabrication defects in the uncovered areas of the low index dielectric layer.

In an embodiment of the invention the thickness of said dielectric waveguide is between 20 nm and 150 nm, preferably between 30 nm and 100 nm.

In an embodiment of the invention the thickness of said low index dielectric layer is between 80 nm and 200 nm, preferably between 30 nm and 200 nm.

In an embodiment of the invention the period of said array of metallic nanostructures is between 20 nm and 500 nm.

In an embodiment of the invention said array of metallic nanostructures is a linear array of nanometer sized lamellas. The advantage of using lamellas for the metallic nanostructures is to provide a simple linear optical filter that is easy to manufacture. The transmission spectrum of the linear optical filter depends on the polarization of incident light. Measuring the polarization state of light may be useful for some applications.

In an embodiment of the invention said first substrate surface is a binary patterned surface. The binary structure enables a higher control of the area of the apertures during fabrication.

In an embodiment of the invention said first substrate surface is a sinusoidal patterned surface. The sinusoidal patterned surface has the advantage that it can originated with standard grating fabrication techniques such as laser interference lithography.

The invention concerns also an optical filter system comprising the optical transmission filter as described and comprises a detector array is fixed to said substrate Adapting a detector array such as a CMOS detector array allows proving a simple and compact optical filter systems that may be applied into a cheap spectrometer and/or provide a multispectral imager.

The invention relates also to a spectrometer comprising at least one optical transmission filter and/or at least one said optical transmission filter system said spectrometer having a spectral resolution lower than 30 nm, preferably lower than 20 nm, for incident light having a wavelength between 300 nm and 790 nm. A spectrometer based on the optical filter and filter system of the invention allows providing a compact, reliable and performant spectrometer at very low cost. The optical filter can be directly fabricated on a detector array without damaging its functionality.

The invention is also achieved by a method of fabrication of an optical transmission filter as described and comprises the following steps a-g:

a) providing a substrate having a contact surface;
b) providing a mold master comprising a nanostructured surface;
c) applying on said contact surface a layer of sol-gel;
d) realizing a nanoimprinted layer of said sol-gel layer by using light illumination of said layer of sol-gel;
e) depositing a high refractive index thin film coating on said nanoimprinted layer;
f) depositing a low refractive index thin film coating on said high refractive index thin film coating;
g) depositing, by oblique coating, on said low refractive index thin film coating a metallic coating.

The method of the invention allows providing a simple and cheap process flow that does not require expensive equipments. The method provides also an easy and precise reproducible process over large areas, such as wafer scale or on a roll-to-roll production line.

BRIEF DESCRIPTION OF THE DRAWINGS

Further details of the invention will appear more clearly upon reading the following description in reference to the appended figures:

FIGS. 2a-2d illustrates a method to fabricate an optical filter array of the invention;

FIGS. 9a-9b illustrate embodiments of an optical filter system of the invention comprising detector of which each pixel faces a plurality of metallic nanostructures;

FIGS. 10 and 11 illustrate embodiments of an optical filter system of the invention comprising a detector having a plurality of detector elements facing subsets of nanostructured metallic arrays;

DETAILED DESCRIPTION AND EMBODIMENTS OF THE INVENTION

Figure 1:
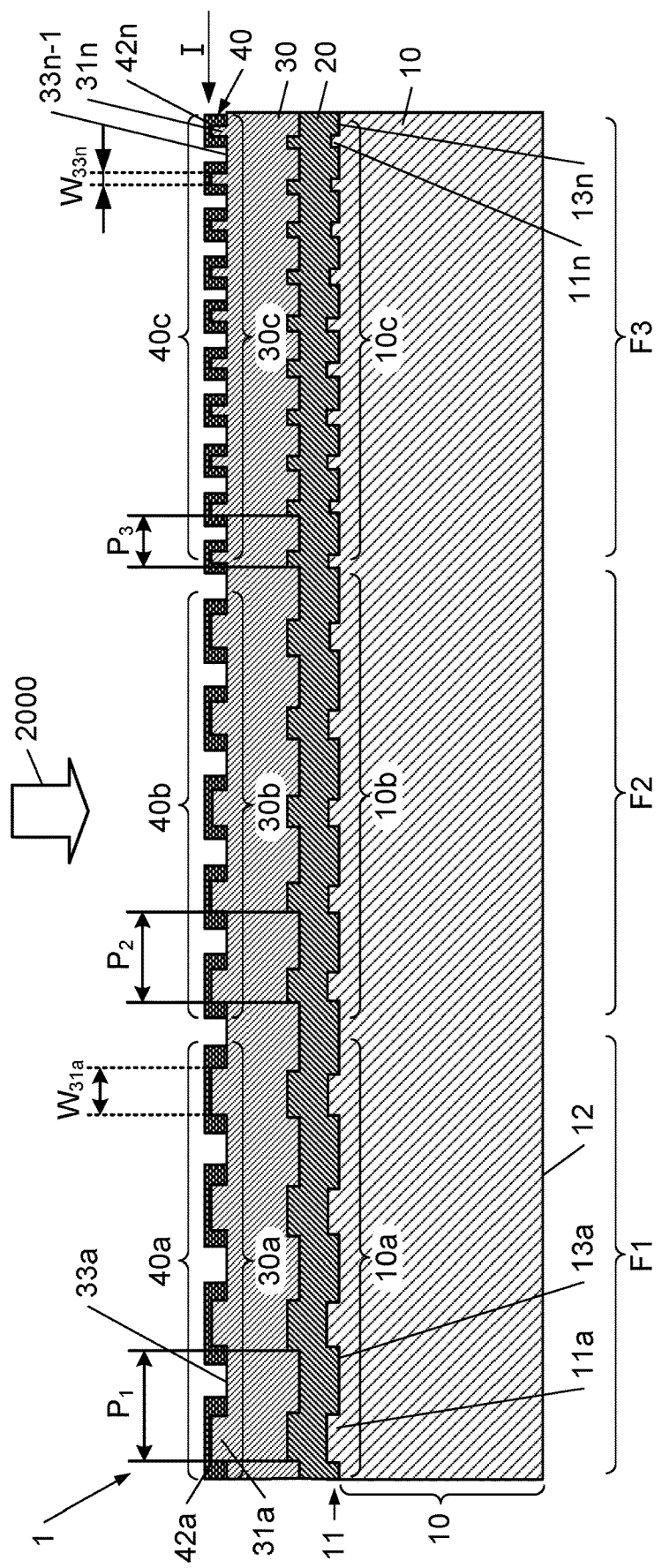
FIG. 1 illustrates a view of a cross section of an optical filter arrays of the invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to the practice of the invention.

It is to be noticed that the term "comprising" in the description and the claims should not be interpreted as being restricted to the means listed thereafter, i.e. it does not exclude other elements.

Reference throughout the specification to "an embodiment" means that a particular feature, structure or characteristic described in relation with the embodiment is included in at least one embodiment of the invention. Thus appearances of the wording "in an embodiment" or, "in a variant", in various places throughout the description, are not necessarily all referring to the same embodiment, but several. Furthermore, the particular features, structures or characteristics may be combined in any suitable manner, as would be apparent to a skilled person from this disclosure, in one or more embodiments. Similarly, various features of the invention are sometimes grouped together in a single embodiment, figure or description, for the purpose of making the disclosure easier to read and improving the understanding of one or more of the various inventive aspects. Furthermore, while some embodiments described hereafter include some but not other features included in other embodiments, combinations of features if different embodiments are meant to be within the scope of the invention, and from different embodiments. For example, any of the claimed embodiments can be used in any combination. It is also understood that the invention may be practiced without some of the numerous specific details set forth. In other instances, not all structures are shown in detail in order not to obscure an understanding of the description and/or the figures. The term "light" includes here visible light as well as UV and IR radiation, covering wavelengths between 100 nm (deep UV) and 20 μm (infrared), and typically wavelengths between 250 nm and 1500 nm, and more typically wavelengths between 350 nm and 1100 nm.

The invention includes the following embodiments.

FIG. 1 shows an embodiment of the optical transmission filter 1, configured to transmit a portion of the spectrum of a light beam 2000 incident on said filter 1. The filter 1 comprises a transparent substrate 10 having a nano-structured first substrate surface 11 and a second substrate surface 12 opposite to said first substrate surface 11, said filter 1 comprising a nanostructured metallic layer 40, defining a plane I, and a waveguide 20 and a low refractive index cladding layer 30 arranged between said first substrate surface 11 and said nanostructured metallic layer 40. All the layers 20, 30, 40 of the filter 1 have conformal shapes with the shape of the first nano-structured surface 11, within the limits of process variations.

The metal of the nanostructured metallic layer 40 may be any metal and is preferably Ag, Au, Cr or Al or alloys thereof. The wording "metal" has to be understood here as any electrically conductive material that comprises at least a portion of conducting compounds. For example, the nanostructured layer 40 may be an alloy or a doped polymer layer that is heavily doped, with for example more than 30% of metallic substances, defined as substances that comprise at least one type of metal. As detailed further, the thickness $t_3$, $t_4$, $t_5$ of the nanostructured metallic layer 40 is preferably in the range of approximately 1 nm to 200 nm.

To the contrary of the filters described in Refs [1] and [2], the filter 1 of the invention comprises a high index waveguide 20 that is modulated, as illustrated in the figures, enabling a simpler fabrication with conformal coatings. In order to minimize losses in the waveguide 20 and obtain a low bandwidth transmission filter 1, the modulation depth of the waveguide 20 structure should be low, typically between 10 nm and 100 nm.

More precisely, the first substrate surface 11 is a patterned surface comprising at least one array 10a-N of nanostructures 12a-12n, consisting of adjacent ridges 11a-11n and grooves 13a-13n, N being the number of arrays and n being the total number of nanostructures defined in the plane of the structured substrate surface 11, n being logically always greater than N. The optical transmission filter 1 may be a single array comprising n ridges 11a-11n and n grooves 13a-13n. The number n of ridges and grooves in a single array is typically greater than 10, more typically greater than 500. A high refractive index dielectric waveguide 20 is arranged on said first substrate surface 11 and has a patterned shape defined by said first substrate surface 11, said dielectric waveguide 20 having a refractive index n1 between 1.45 and 3.3.

A low index dielectric layer 30 is arranged on top of said dielectric waveguide 20 and has a patterned shape defined by said dielectric waveguide 20, said patterned shape defining adjacent low-index dielectric ridges 31a-31n and grooves 33a-33n, said low-index dielectric layer 30 having a refractive index n2 between 1.15 and 1.7, n2 being lower than n1.

An array 40 of metallic nanostructures 42a-42n is arranged on at least a portion of said low index dielectric layer 30 and has, at least partially, a patterned shape defined by said low index dielectric waveguide 30. Said array 40 comprises at least one array 40a-40N comprising metallic nanostructures 42a-42n that are arranged with a predefined periodicity P. N may be any number and is preferably minimum 3, preferably greater than 15, possibly greater than 50, even greater than 100.

A single filter F is defined and formed by a stack of a nanostructured portion of said substrate 10, having a fixed predetermined period P, and on which respectively a waveguide 20, a low-index dielectric layer 30 is deposited, having as consequence that all layers 11, 20, 30 have substantially the same nanostructured shape. The nanostructured layers 10, 20, 30 have conformal shapes in the limit of process variations and the material properties of the layers 10, 20, 30 of said stack. The stacked layers 10, 11, 20, 30 form a optical transmission filter comprising at least one optical filter F1-N. The optical transmission filter 1 comprises preferably minimum 3, preferably greater than 15, possibly greater than 50 filters F1-FN.

It is understood that in preferred embodiments the waveguide layer 20 is directly deposited on said structured substrate layer 10, that a low index layer 30 is deposited directly on said waveguide layer 20 and that said metallic layer 40 is deposited directly on said low index layer 30. In variants other layers may be arranged in contact between any two of successive layers 10,20,30, 40 of the filter stack. Such other layers may be for example adaptation layers that have thicknesses smaller than 10 nm and have conformal shapes as said structured first surface layer 11. Said other layers may comprise electrically conducting portions, such as metallic portions.

In normal use the optical transmission filter 1, is configured to transmit a portion of the spectrum of a light beam 2000 incident on said filter 1, to the side of said metallic layer 40, but may be used also with the metallic layer positioned to the opposite side of said incident light beam 2000m The optical filter 1 of the invention may also be used in optical devices in which light is incident to opposite directions on the filter, i.e. one optical beam 2000 incident to the side of the metallic array 40 and another beam 2000' incident to the side of said substrate 10.

Figure 8A:
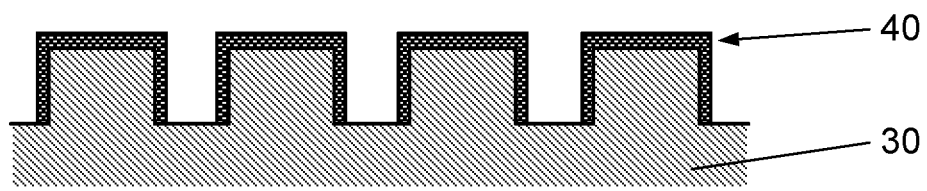
FIGS. 8a-g, 8i, and 8j illustrate embodiments of a nanostructured metallic layer deposited on a nanostructured low-index dielectric layer.
Figure 8B:
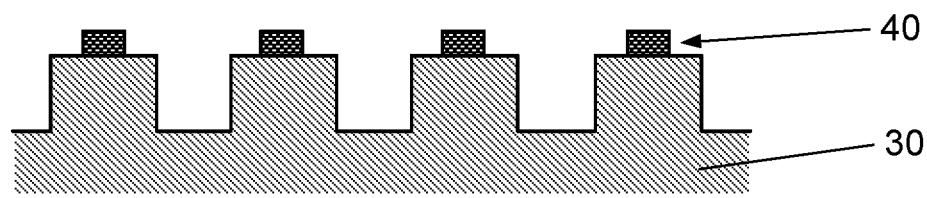
Figure 8C:
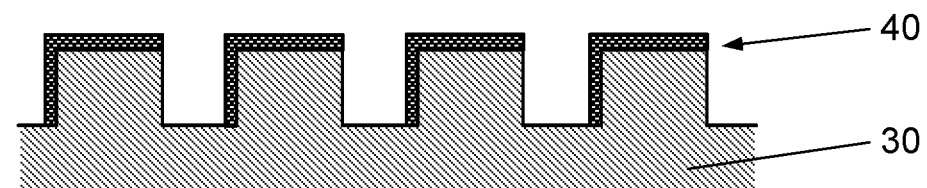
Figure 8D:
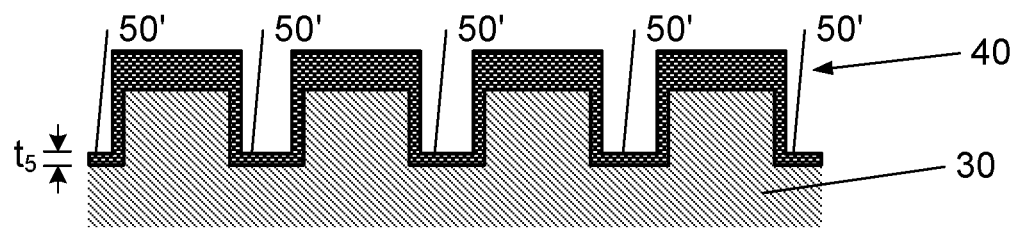
Figure 8E:
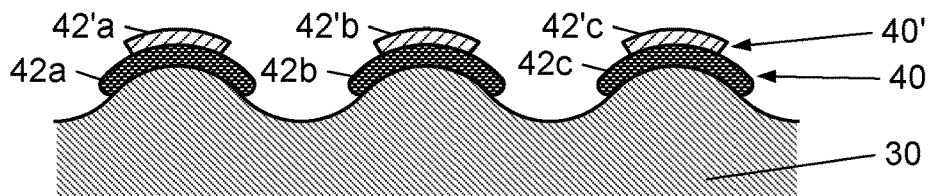
Figure 8F:
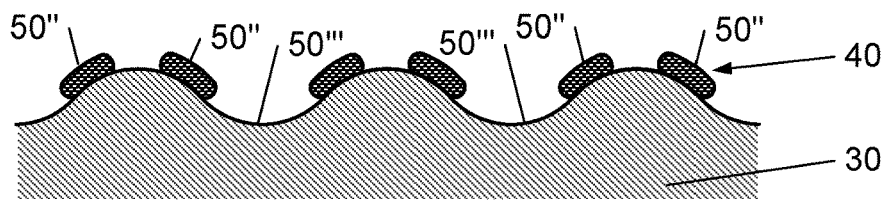
Figure 8G:
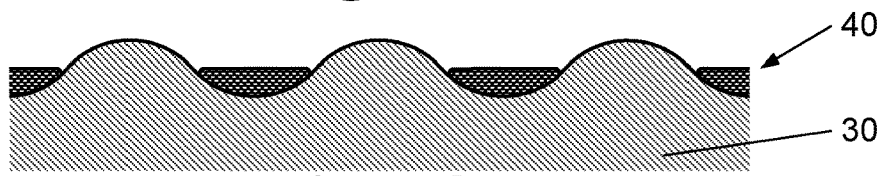
Figure 8I:
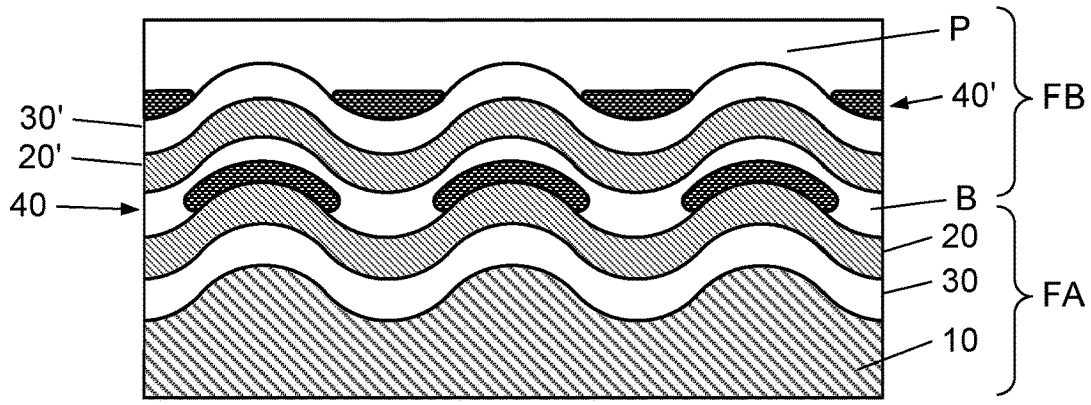

In an advantageous variant of the invention at least two stacks of filter layers 20, 30, 40 may be arranged on top of each other, such as schematically illustrated in the cross section of FIG. 8i. The variant of FIG. 8i comprises a first stack of structured layers 10, 20, 30, 40. On the structured metallic layer 40 a structured buffer layer B is arranged having an index of refraction preferably lower than 1.5. The buffer layer B has a conformal structure of the layers 10, 20, 20, 40 of the first stack that forms a first filter layer FA. ON said first filter layer Fa a second filter layer FB is arranged comprising a second waveguide layer 20', a second low dielectric layer 20' and a second array 40' of metallic nano-structures. As illustrated in FIG. 8i said second array 40' of metallic nanostructures may be different than said first array 40 of metallic nano-structures.

Piling several filter layer Fa, Fb on top of each other provides further design flexibility such as a filter having a lower total transmission but having a transmission bandwidth that may be smaller than can be obtained by a single filter stack 10, 20, 30, 40. As illustrated in FIG. 8i the optical filter 1 may comprise a protection layer P that may be an anti-reflection layer.

In another advantageous variant of the invention two filter stacks may be arranged to each side of said substrate 10 and may be different filter layers.

Figure 8J:
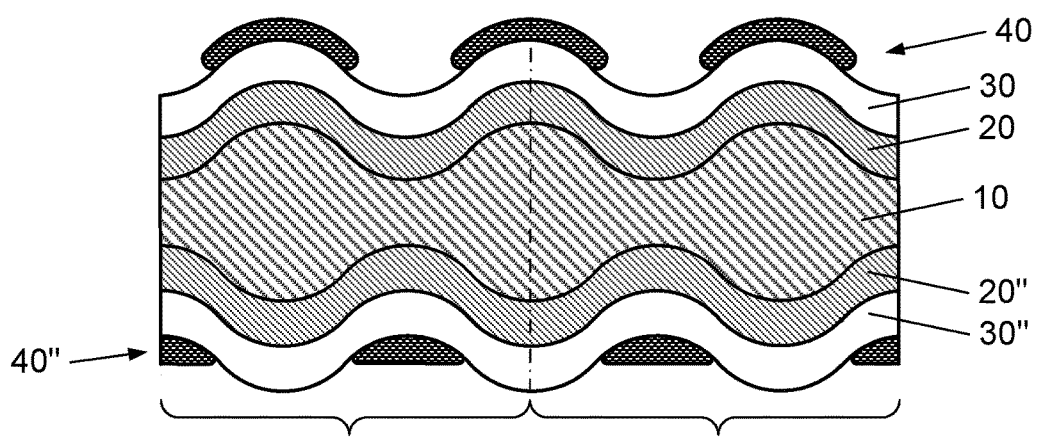

FIG. 8j illustrates a variant of a filter 1 of the invention comprising to one of its sides a filter FD that comprises to one side of the substrate 10 a filter layer stack 20", 30" without metallic nano-structures.

The metallic layer 40 is deposited in the last deposition process step, i.e. on the nanostructured low-index dielectric layer 30. The metallic layer 40 may have a conformal shape as the underlying layers 11, 20, 30, at least regarding its periodicity, but may have differences such as the variation of the metal thickness in its plane I as explained further in detail. For example, as explained further in the method section, in a preferred embodiment, the metal layer 40 is deposited by oblique coating so that in such an embodiment the metal layer 40 covers only a portion of the nanostructured low-index dielectric layer 30.

In an embodiment said arrays 40a-N of metallic nanostructures 42a-42n comprises an array of apertures 50a-50n, each of said apertures 50a-50n facing one of the grooves 33a-33n of said low index dielectric layer 20.

In an embodiment said array 40 of metallic nanostructures 42a-42n has a non-uniform thickness and has a thickness $t_3$ (FIG. 3) of the metallic nanostructures 42a-42n on the ridges 31a-n of said low index dielectric layer 20 is greater than its thickness $t_4$ on the sides of said ridges 31a-n (FIG. 3) and/or greater than the thickness $t_5$ (FIG. 8c) on the grooves 33a-n of said low index dielectric layer 20. In variants said thickness $t_5$ may be greater or smaller than said thickness $t_4$.

In an advantageous embodiments of the invention the optical filter 1 comprises a plurality of N filters $F_1$-$F_N$ as described above. The filters $F_1$-$F_N$ may be adjacent filters or may be filters of which two at least are separated by a separation structure 10", 10''' as further described in embodiments. A plurality of N filters $F_1$-$F_N$ is achieved by configuring a plurality of N different stacks of subarrays 10a-10n; 20a-20n, 30a-30n, 40a-40n having different periodicities $P_1$-$P_N$ in at least one dimension, N being preferably greater than 10, more preferably greater than 50. In such an embodiment the nanostructured substrate composing the mth filter Fm is characterized by the repetition of a modulation with a given period $P_m$, m being any number between 1 and N. The variation of the period of the nanostructured first substrate surface 11 in one dimension or in two dimensions, in the plane of the surface 11, allows providing to a plurality of filters in the same plane. For spectrometric and multispectral imaging applications, the number N of filters is typically higher than 5, preferably 10, more preferably higher than 30, even higher than 100. The number N of filters to be chosen depends on the total bandwidth wherein a spectrum is to be provided and the bandwidth of each individual filter $F_m$. FIG. 1 illustrates an example of an optical filter 1 comprising three different filters $F_1$, $F_2$, $F_3$ (N=3) adjacent to each other. The number of metallic nanostructures 42a-n per filter $F_m$ may be different for the different filters $F_1$-$F_N$ of the optical filter 1. The size of a typical filter $F_1$-$F_N$ may be any size and preferably below 10 mm in at least one dimension, more preferably 5 mm, even more preferably 2 mm in order to fit in a consumer electronic device. A typical filter $F_1$-$F_N$ comprises typically $10^4$ metallic nanostructures in one dimension and typically $10^8$ in a 2-dimensional filter 1. In the case of a linear filter, comprising metallic lamellas as illustrated in for example FIG. 12, its width, defined across said lamellas can be smaller than 100 µm, preferably smaller than 10 µm. The total thickness of the optical filter 1, defined perpendicular to said plane I, is typically 1 mm, preferably lower than 0.7 mm.

In embodiments of the invention, illustrated in FIGS. 3-6, said metallic nanostructures 42a-42n cover at least a portion of the ridges 31a-31n of said low index dielectric layer 30. In the embodiments of FIGS. 3-6 the substrate layer 10 comprises a base plate 10' and a nanostructured layer 15', such as a nanostructured sol-gel layer 15' as described further as an example in the method section. It is understood that, in variants, the substrate layer 10 may be a monolithic layer comprising a nanostructured surface that may be produced for example by direct etching and/or ablation techniques and/or laser techniques to avoid the use of an additional layer such as a polymer layer 15'.

Figure 3:
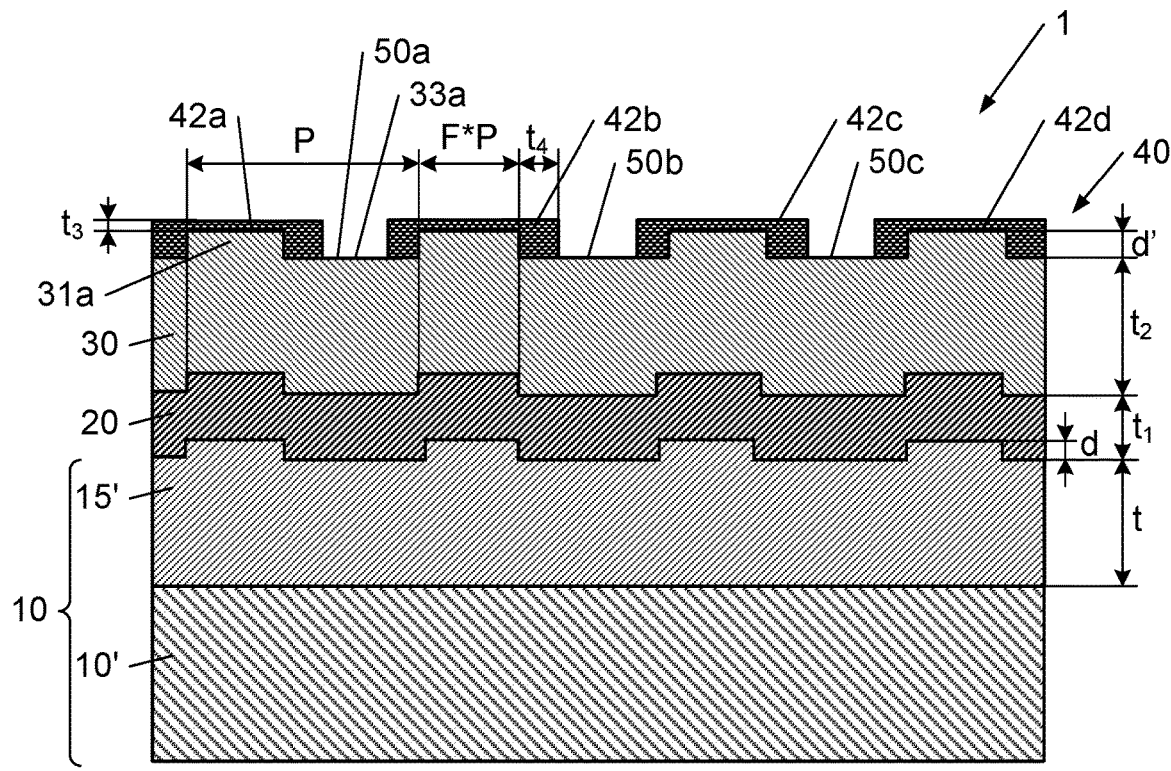
FIGS. 3-7 illustrates a cross section of embodiments of optical filter array showing the involved main parameters.
Figure 4:
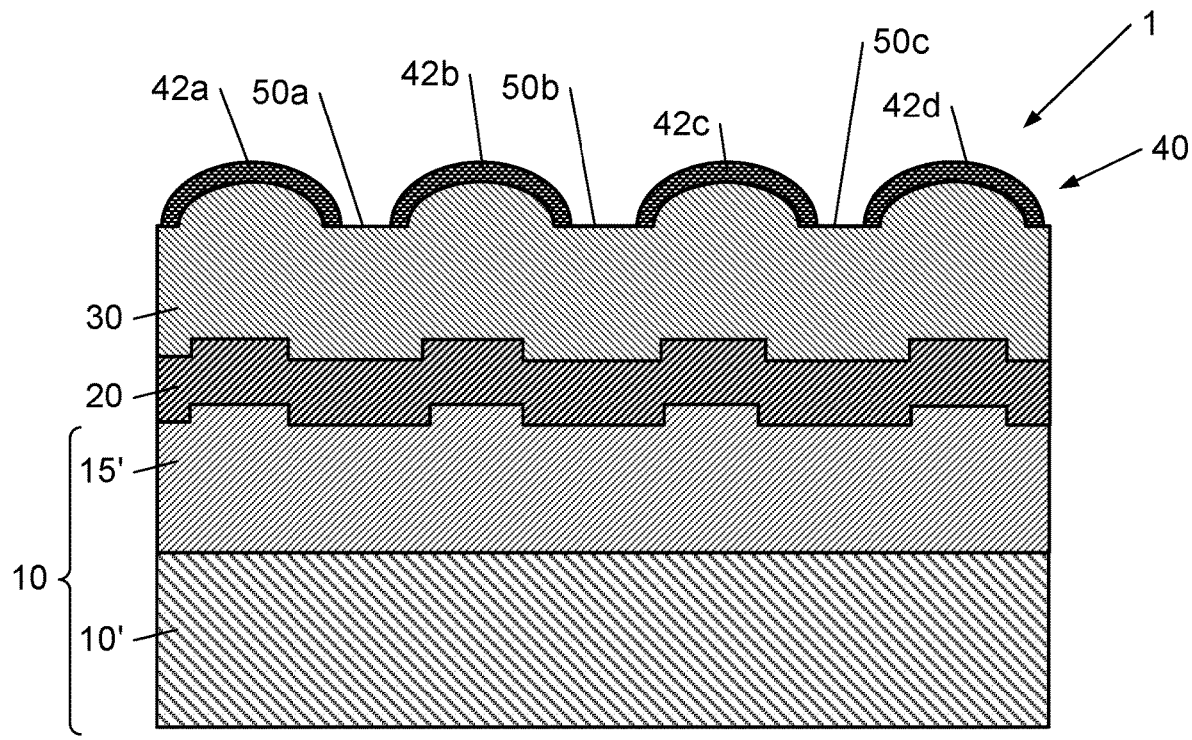
Figure 5:
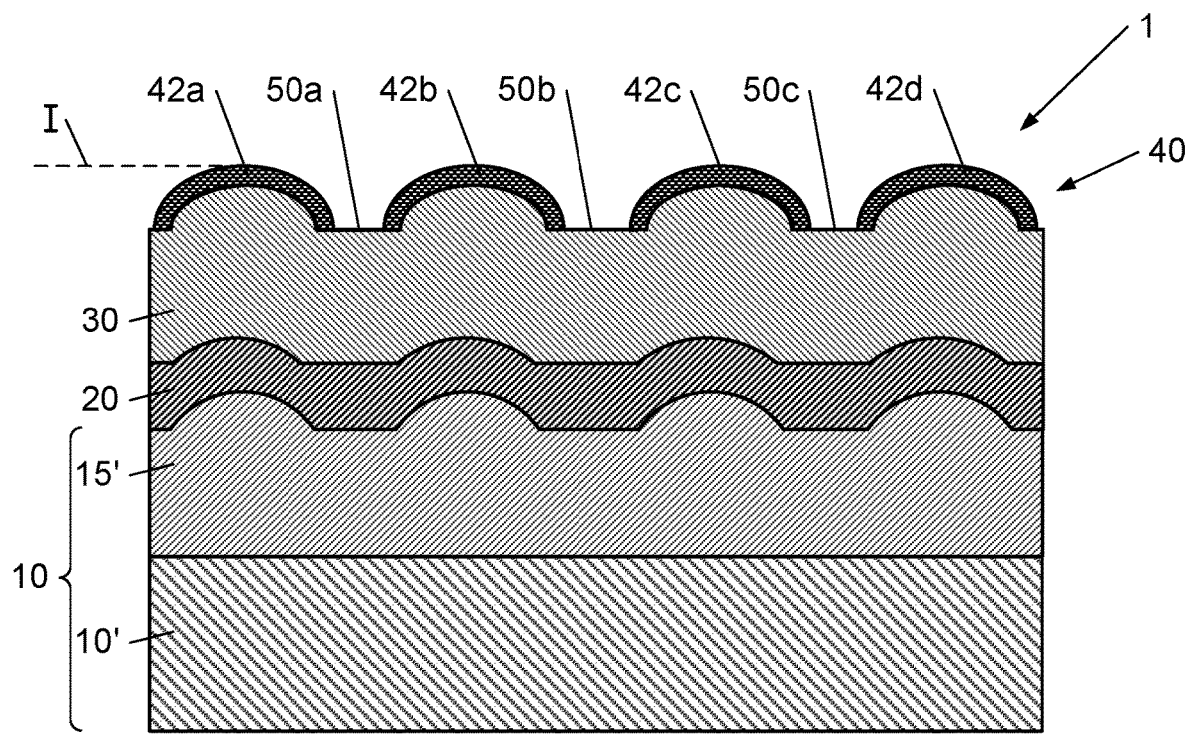
Figure 6:
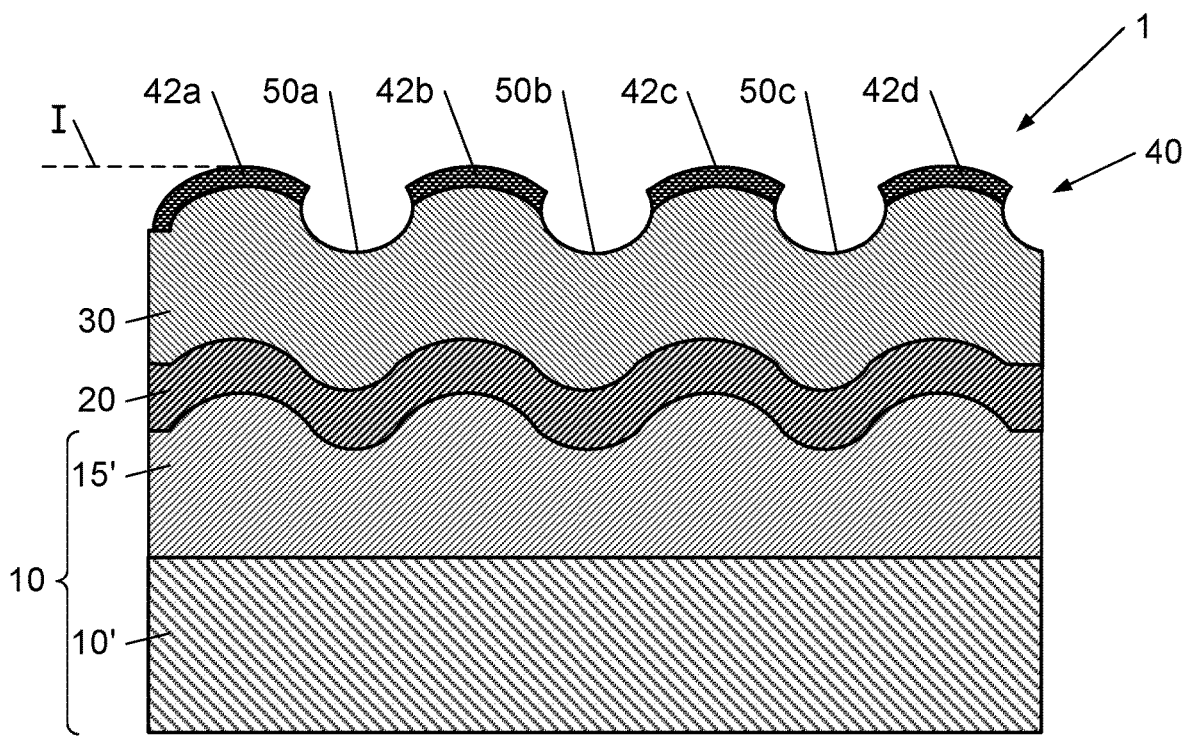

FIG. 3 shows an exemplary cross-section of a binary nanostructured filter 1 comprising a nanostructured metal layer 40 present on the ridges 31a-31n of a low-index nanostructured layer 30 and presenting through-apertures 50a-50n facing the grooves 33a-33n of said low-index layer 30. Typical geometrical parameters of the layers and structures of embodiments of the invention are the following:

thickness d of the ridges 11a-11n of the substrate layer 10: between 30 nm and 150 nm;

thickness $t_1$ of the waveguide layer 20: between 20 nm and 150 nm, preferably between 30 nm and 100 nm;

thickness $t_2$ of the low-index layer 30: between 10 nm and 300 nm, preferably between 30 nm and 200 nm;

thickness d' of the ridges 31a-31n of the low index layer 30: between 30 nm and 150 nm;

period $P_{1-N}$ of the ridges in a single filter $F_{a-N}$: between 20 nm and 200 nm, and typically between 200 nm and 500 nm for variants that are configured to operate in the visible range;

the width W31a-n of the ridges 31a-n of the low-index layer 30 is expressed as f*P, P being the period, and f being typically between 0.1 and 0.9, preferably between 0.2 and 0.8.

As shown in FIG. 3, the thickness $t_3$ of the metal layer 40 on the ridges of the low-index layer 30 may be different on top of the ridges than the thickness $t_4$ to the side of the ridges. For example $t_4$ may be between 20 nm-100 nm and $t_3$ may be between 10 nm-80 nm. In variants $t_3$ may be greater than $t_4$.

In an embodiment said array 40 of metallic nanostructures 42a-42n is a linear array 45 of nanometer-sized lamellas 45'. It is understood that such linear array 45 must not necessarily comprise linear lamellas, but may also be a linear array of curved lamellas. The lamellas extend for at least 2 μm in the longitudinal direction, typically for at least 2 mm, while having a cross section in the transversal direction such as shown in FIG. 3.

Figure 7:
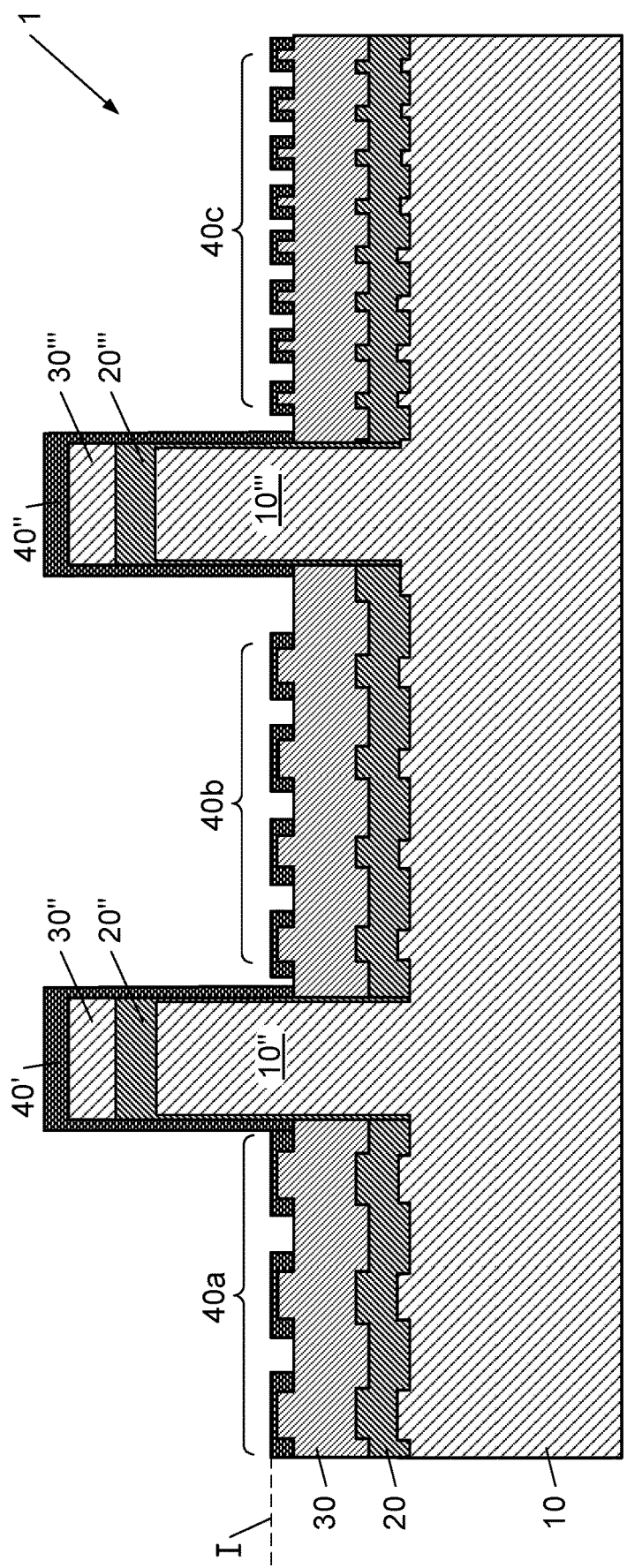

FIG. 7 illustrates a variant of the invention in which the filters F1-FN are separated by separation structures 10", 10'". This allows reducing cross coupling of the light from one filter to another. Said separation structures 10", 10'" may also be configured to be used as baffles in an optical system or the spectrometer 4 of the invention, further described.

FIGS. 8a-g illustrate different embodiments of the nanostructured metal layer 40 deposited on a nanostructured low-index layer:

FIG. 8a illustrates a binary structured low-index layer 30 having ridges completely covered with metallic nanostructures 42a-42n;

FIG. 8b illustrates a binary structured low-index layer 30 having ridges that are covered only partially with metallic nanostructures 42a-42n;

FIG. 8c illustrates a binary structured low-index layer 30 having ridges that are asymmetrically covered with metallic nanostructures 42a-42n;

FIG. 8d illustrates a binary structured low-index layer 30 on which a non-uniform nanostructured layer 40 is deposited, comprising thin portions 50' that are partially transparent to incident light; In embodiments the thin portions 50' may be present on the ridges and the thick portion in the grooves of said low-dielectric layer 30;

FIG. 8e illustrates a sinusoidal structured low-index layer 30 having ridges that are covered with two different metallic nanostructures 42a-c, 42'a-c;

FIG. 8f illustrates a sinusoidal structured low-index layer 30 covered with a nanostructured layer 40 comprising holes 50" on the ridges and other holes 50'" grooves of the low-index dielectric layer 30;

FIG. 8g illustrates a sinusoidal structured low-index layer 30 having grooves that are at least partially covered with metallic nanostructures;

FIG. 8i illustrates a portion of an optical filter comprising two piled stacks of filter layers FA, FB;

FIG. 8j illustrates a portion of an optical filter comprising to each side of a substrate 10 a filter layer stack forming two different filters FC, FD.

In all embodiments of the invention at least a portion of the nanostructured metallic layer 40 is at least partially transparent to at least a portion of the predetermined transmission spectrum of the related filter Fn. It is understood that this portion may be a through-aperture, illustrated in FIGS. 8a-c, 8e-9 or a partially transparent portion, illustrated in FIG. 8d. In the case of a through-aperture the shape of the aperture may be conical or substantially cylindrical or whatever other shape. In the case that there are no through apertures different configurations are possible. For example FIG. 8d shows a cross section of an embodiment of a filter 1 comprising a metal layer 40 that has a thin portion deposited on the grooves of the low-index layer 4. In an example of a filter F according to the embodiment of FIG. 8d, configured to transmit light having a central wavelength of 500 nm and a bandwidth of 40 nm, the transmission of said thin layer for wavelengths between 500 and 520 nm may be 90% while its transmission for wavelengths between 480 nm and 500 nm, not including 500 nm, may be 70%. In the embodiment of FIG. 8d the thick metal layer portions on the ridges of said low-index dielectric layer are not transparent to visible light. In variants, the opposite may be realized, i.e. thick metal layer portions may be present in the grooves of the low-index dielectric layer 30 and thin, partially transparent metal layer portions may be present on the grooves of the low-index dielectric layer 30. In variants the metal layer 40 must not have a uniform thickness and may have different thicknesses on the grooves and/or ridges of a single filter Fn.

In an embodiment of the invention said first substrate surface 11 is a binary patterned surface.

In another embodiment said first substrate surface 11 is a sinusoidal patterned surface.

The substrate 10 is made of a transparent material, typically glass or polymer with refractive index ranging from 1.5 to 1.7. The patterning of the substrate 10 may for example be performed with UV nanoimprint lithography, requiring the need for an additional sol-gel layer, or using hot embossing. The sol-gel material has a refractive index similar to glass with refractive index ranging from 1.5 to 1.7. Alternatively to sol-gel, thermoformable polymer or UV-crosslinkable polymer or UV crosslinkable monomer or a mixture comprising a polymer matrix or a combination thereof may be used. The cladding material is a thin film with a refractive index similar to the substrate, such as $SiO_2$, in order to minimize losses in the waveguide.

In embodiments of the invention waveguide material is a high index material such as ZnS, $Ta_2O_5$, $TiO_2$, $Al_2O_3$, $S_{i3}N_4$, crystalline Si, amorphous Si, microcrystalline Si, SiOx, $SiO_2$, $Cr_2O_3$, AlN in order to provide a higher refractive index than the refractive index of said substrate 10 and said low index layer 30.

In embodiments of the invention the cladding material, i.e. the low index material is a thin film 30 with a refractive index similar to the substrate 10, such as SiO2, in order to minimize losses in the waveguide 20.

In variants of the invention the waveguide 20 may be the same material as the low index layer 20 but having a different doping.

Figure 12:
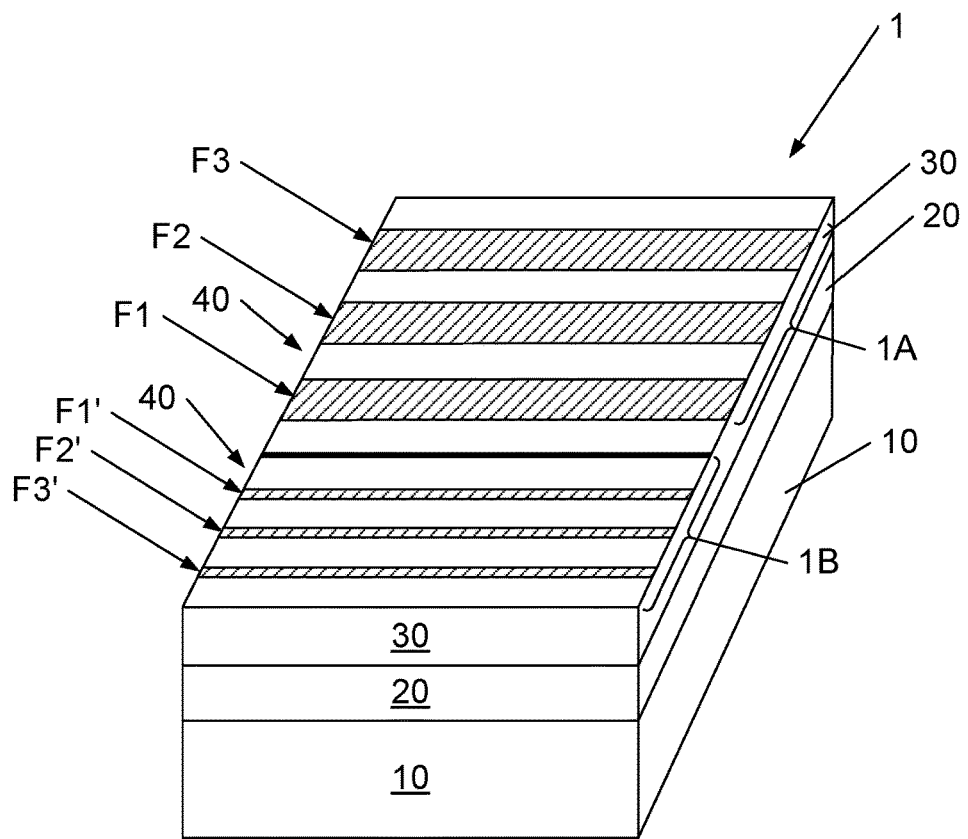
FIGS. 12 and 13 illustrate a 3D view of spectrometers comprising each at least two different types of nanostructured metallic arrays
Figure 13:
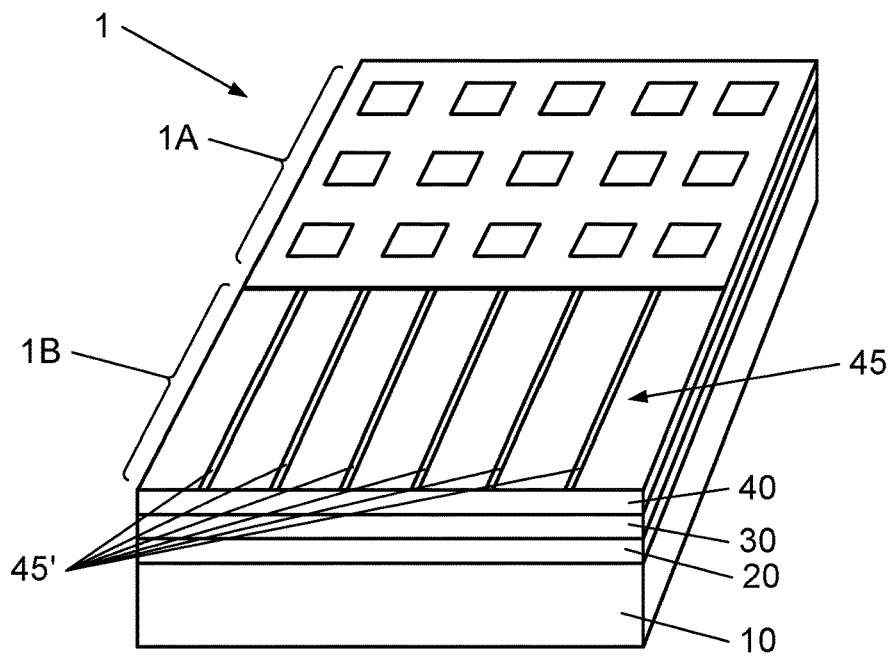

In an advantageous embodiment of the invention the optical filter 1 may comprise a substrate 10 comprising at least two different structured surface portions so that different filter type arrays may be configured in a single optical transmission filter 1, as illustrated in the exemplary embodiments of FIGS. 12 and 13. FIG. 12 shows an exemplary monolithic filter 1 comprising two filter portions having different types of lamella arrays, each filter portion comprising at least 3 filters, F1-F3, F1'-F3'. FIG. 13 illustrates a monolithic filter configuration comprising a two dimensional structured filter portion 1A and linear structured filter portion 1B. Such configurations may be configured in a monolithic optical filter system 2 and/or a spectrometer 4 comprising a detector arrays 3 consisting of a linear detector array portion and a two dimensional detector array portion.

In variants of execution of the invention said substrate layer 10 may have another shape than a plate and may have any shape such as a cubic shape having 6 surfaces. In variants the filter layer stack 20, 30, 40 may be arranged on at least one of said six surfaces. This may be useful in for example beamsplitters comprising at least one filter 1 on one of its surfaces. Other shapes of the substrate 10 may considered as well, such as a prism shape. The substrate 10 may also be a refractive lens or any optical element comprising at least one transparent portion such as a mirror comprising a transparent base, made in for example glass or a polymer, and comprising at least one transparent aperture, which can be useful in optical instruments such as microscopes or telescopes.

The invention concerns also an optical filter system 2 comprising the optical transmission filter 1 as described and comprises a detector array 3 fixed to said substrate 10, as illustrated in FIGS. 9*a-b*. FIG. 9*a* illustrates an optical filter system 2 arranged at a distance to the detector array 3, for ex by means of a spacer. FIG. 9*b* illustrates an optical filter system 2 comprising an optical filter 1 fixed to a detector array 3 by a layer 17 that may be a polymer, or may be the passivation layer of the detector chip 3 In the embodiments of FIGS. 9*a* and 9*b* each filter F1-FN of the optical transmission filter 1 faces a single pixel of the detector array 3. In variants of the invention, illustrated in FIG. 10 each filter F1-FN faces a plurality of detector elements $3_1$-$3_x$, which has the advantage of minimizing the influence of cross talk between the filters while also increasing the alignment tolerances, so as to provide a more reliable and precise device. In the embodiment of FIG. 10 the number x of detector pixels is typically, but not necessarily, lower than said number n of metallic nanostructures The invention relates also to a spectrometer 4 comprising at least one optical transmission filter 1 and/or at least one said optical transmission filter system 2, said spectrometer 4 having a spectral resolution of lower than 30 nm, preferably lower than 20 nm, for incident light having a wavelength between 300 nm and 790 nm. In an example, the spectrometer 4 may comprise an array 5 of microlenses as illustrated in FIG. 11

In exemplary realizations the spectrometer is configured for visible and near-infrared light applications, so as to cover the absorption range of silicon detectors, and may comprise between 20 and 100 linear or two dimensional filters F1-N, each filter having a bandwidth of maximum 30 nm.

In exemplary realizations the spectrometer 4 is configured for near-infrared light applications for wavelengths between 900 nm and 3 μm and may comprise between 20 and 50 filters, each filter having a bandwidth of maximum 100 nm.

In exemplary realization the spectrometer is configured—infrared light applications for short wavelength infrared (SWIR) light between 3 μm and 10 μm and may comprise between 20 and 50 filters, each filter having a bandwidth of maximum 150 nm.

In advantageous variants a spectrometer 4 may comprise several optical filters 1 and/or optical filter systems 3, each filter 1 or system 2 being configured for different wavelength ranges. In an example a spectrometer 4 may comprise a first filter system configured for visible light transmission and a second filter system configured for SWIR light transmission.

The invention relates also to a multispectral imager 5 comprising at least one optical transmission filter 1 and/or at least one said optical transmission filter system 2, said multispectral imager may have a spectral resolution lower than 30 nm, preferably lower than 20 nm, for incident light having a wavelength between 400 nm and 790 nm. The detector is able to measure N different images, where N is the number of spectral channels. Given a resolution of the detector array of 1024×768 pixels and at least 16 spectral channels, the maximal resolution of an image in a single channel is 256×192 pixels. A lens array placed in front of the filters can be used to generate the N images.

In realizations of the spectrometer 4 or the multispectral imager 5, combinations of optical elements such as micro lenses, micro mirrors and/or fiber optics may be incorporated. In variants said spectrometer 4 may comprise an array of addressable mems structures, such as an array of electrostatically addressable micro-shutters. This may be useful to calibrate the spectrometer and/or to correct for parasitic stray light and/or define reference intensities.

An array of microscale structures such as apertures can be aligned with respect to the optical transmission filter 1 in order to reduce the range of light incidence angles.

In embodiments the optical transmission filter 1 and optical filter system 2 may comprise portions that each have different oriented metallic nanostructures, such as illustrated in FIG. 12 and FIG. 13. For example an optical transmission filter 1 may comprise a first portion comprising N filters in the visible range, which produced spectrum is oriented in a first direction, and comprising a second portion comprising M filters in the infrared range, and of which produced spectrum is oriented in a second direction making an angle to the first direction, such as an angle of 90°. It is also understood that the filter array Fa-N may be arranged along a predefined curve in the plane of the filters Fa-N. In variants filter arrays may be aligned according at least two crossing virtual lines.

The optical filter 1 may comprise portions of linear metallic nanostructures that are perpendicular to each other in order to independently transmit both light polarizations.

The invention is also achieved by a method of fabrication of an optical transmission filter, illustrated in FIGS. 2*a*-2*d* as described and comprises the following steps a-g:
 a) providing a substrate 10 having a contact surface 10';
 b) providing a mold master 200 comprising a nanostructured surface comprising at least one array 200*a-c* of microstructures;
 c) applying on said contact surface a sol-gel layer 15;
 d) realizing a nanoimprinted layer 15' of said sol-gel layer 15' by using UV light illumination of said sol-gel layer;
 e) depositing a high refractive index thin film coating 20 on said nanoimprinted layer 15' as illustrated in FIG. 2*b*;
 f) depositing a low refractive index thin film coating 30 on said high refractive index thin film coating 20, as illustrated in FIG. 2*c*;
 g) depositing, by applying obliquely a coating 300, on said low refractive index thin film coating 30 a metallic coating 40, as illustrated in FIG. 2*d*;

In an alternative embodiment, the method of the invention comprises the following steps (a'-f'):
 a') providing a substrate 10 made of thermoplastic material;
 b') providing a mold master 200 comprising a nanostructured surface comprising at least one array 200*a-c* of microstructures;
 c') applying a temperature elevation of the substrate 10 and a pressure provided by the mold master 200 in order to transfer its shape to the substrate 10, this technique being usually referred as thermal embossing;
 d') depositing a high refractive index thin film coating 20 on the embossed substrate 10;
 e') depositing a low refractive index thin film coating 30 on said high refractive index thin film coating 20.
 f') depositing, by applying obliquely a coating 300, on said high refractive index thin film coating 20 a metallic coating 40.

In another alternative embodiment the following steps (a"-f") are executed:
 a") providing a substrate 10 having a contact surface 10';
 b") providing a mold master 200 comprising a nanostructured surface comprising at least one array 200*a-c* of microstructures;

c'') applying on said contact surface a sol-gel layer 15;

d'') realizing a nanoimprinted layer 15' of said sol-gel layer 15' by using UV light illumination of said sol-gel layer;

e'') depositing a high refractive index thin film coating 20 on said nanoimprinted layer 15' f'') depositing a low refractive index thin film coating 30 on said high refractive index thin film coating 20 g'') depositing a metallic coating 40 on said low refractive index thin film coating 20;

h'') removing mechanically or by chemical etching at least a portion of the metallic coating present on the ridges of the structured low refractive index thin film coating, thus creating apertures.

The optical filters 1 of the invention can be fabricated with nanoimprint and thin film coatings, which can be implemented at low cost in a wafer scale or roll-to-roll production. This implies in particular that the film thicknesses are the same over all filters.

Another important aspect is the partial coverage of the metallic top layer, obtained with oblique evaporation and the self-shadowing from the underlying corrugation: the involved deposition angles may range up to 85° from the normal of the substrate 10. The self shadowing is even more effective if the fill factor of the grating is high. In a particle realization, the relationship between the thicknesses $t_3$ and $t_4$ depend on the deposition angle as well as the chosen coating technique (e.g. evaporation or sputtering. In particular, $t_3$ is expected to decrease for large deposition angles, while t4 is expected to increase.

Alternatively, the partial coverage of the metallic top layer can be obtained by applying a conformal metallic coating onto the low refractive index thin film and removing mechanically or by chemical etching at least a portion of the metallic coating present on the ridges of the structured low refractive index thin film coating. Alternatively, metallic material can be placed in the grooves of the structured low refractive index thin film coating by wet coating techniques such as ink-jet printing or slot-die coating. A sintering step after coating may be used to ensure conductivity within the metallic top layer.

Simulation Results of Implemented Optical Filters

Figure 14:
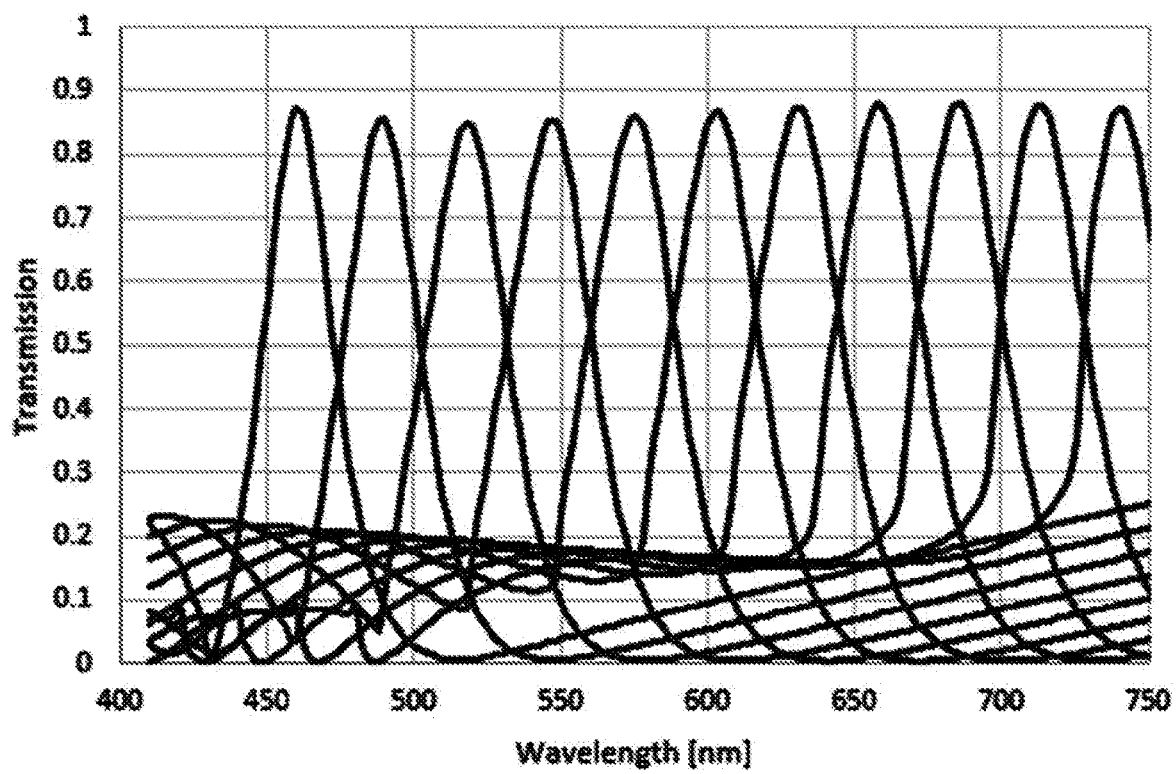
FIGS. 14 and 15 show simulation results of prior art optical filters.

FIG. 14 shows simulations of the device disclosed in Ref[1]. The results show that the lowest bandwidth that may be obtained with such a device is 30 nm. The residual transmission is also important and at least 18% over the spectral range of 400 nm and 750 nm.

Figure 15:
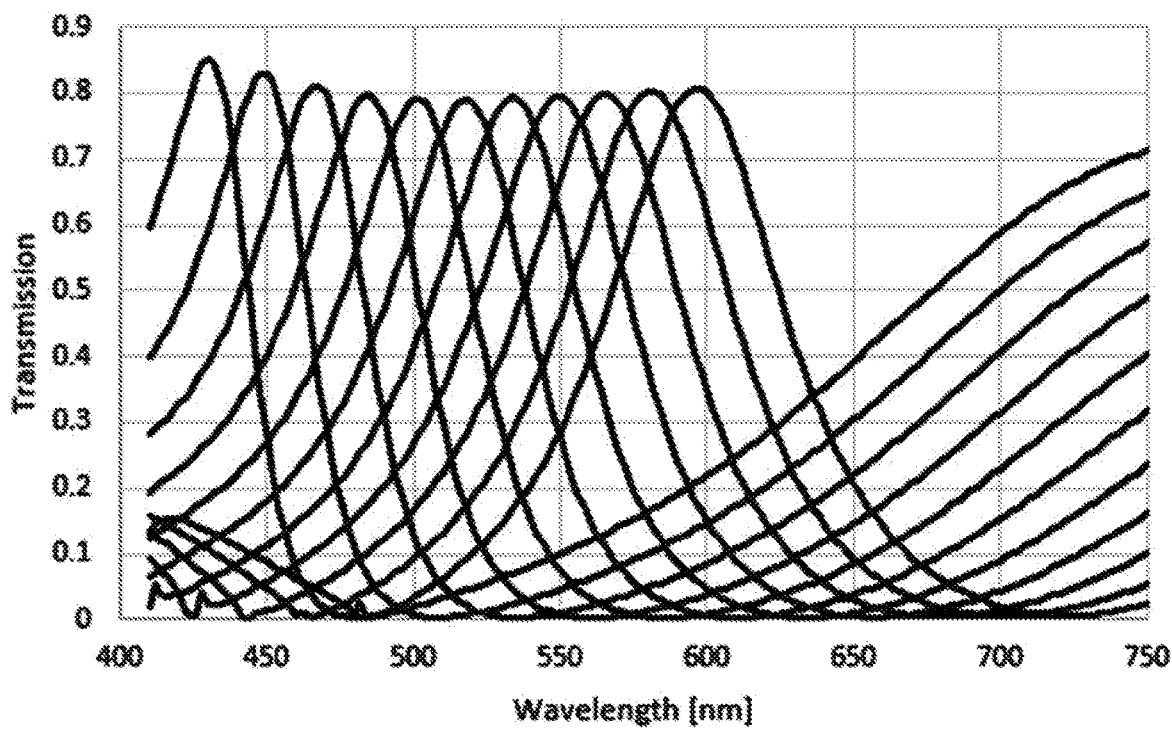

FIG. 15 shows simulations of the device disclosed in Ref[2]. The results show that the lowest bandwidth that may be obtained with such a device is quite high and more than 50 nm FWHM.

FIGS. 16-23 show simulation results obtained with embodiments of the invention. The array of filters Fa-FN exhibit distinct transmission spectra with defined peaks. The power level of transmitted light is much greater than the expected power level from conventional theory or than any filter of prior art.

The simulations indicate that the unusual properties of the optical filter of the invention are probably due to resonance effects of the incident light with the combination of the nanostructured waveguide 20, the low index layer 30 and the nanostructured metal layer 40. Most probably other effects such as interference due to array geometries also contribute to the wavelength selective enhanced transmission.

Overall, the filter 1 allows providing a window of transmission (full width half maximum, FWHM, below 30 nm, preferably below 20 nm), realized at resonance, having a transmission of typically higher than 50%, possibly higher than 70%. Outside resonance, the transmission level of the filter 1 is low, typically below 20%, possibly below 10%.

Some implementation examples are now discussed.

In an exemplary realization the metallic nanostructure has a binary shape and has a coating as illustrated in the embodiment of FIG. 3. The substrate and the cladding materials are made of $SiO_2$. The refractive index of the sol-gel is modeled by the one of $SiO_2$, which is a typical value of standard sol-gel materials. The waveguide 30 is made of ZnS. The metallic coating 40 is made of Al. The grating modulation depth d is 30 nm, reduced to d'=20 nm accounting for the loss of profile fidelity after thin film coating. The thickness of sol-gel is typically ranging between 3 um and 70 um, but it does not influence the transmission in this example because the refractive index of the sol-gel and the substrate is the same. The other thicknesses are: $t_1$=30 nm, $t_2$=170 nm, $t_3$=20 nm, $t_4$=20 nm, F=0.75. The pitch values of respectively 280, 300, 320, 340, 360, 380, 400, 420, 440, 460, 480 nm, yield respectively the 11 transmitted intensity profiles shown in FIG. 16, as simulated using the rigorous coupled wave analysis at normal incidence with electric field polarized across the grating lines. In manufacturing, an angle of 85° of the metallic coating from the surface normal is estimated, in order to have self shadowing from the structure and the targeted value of F.

Figure 16:
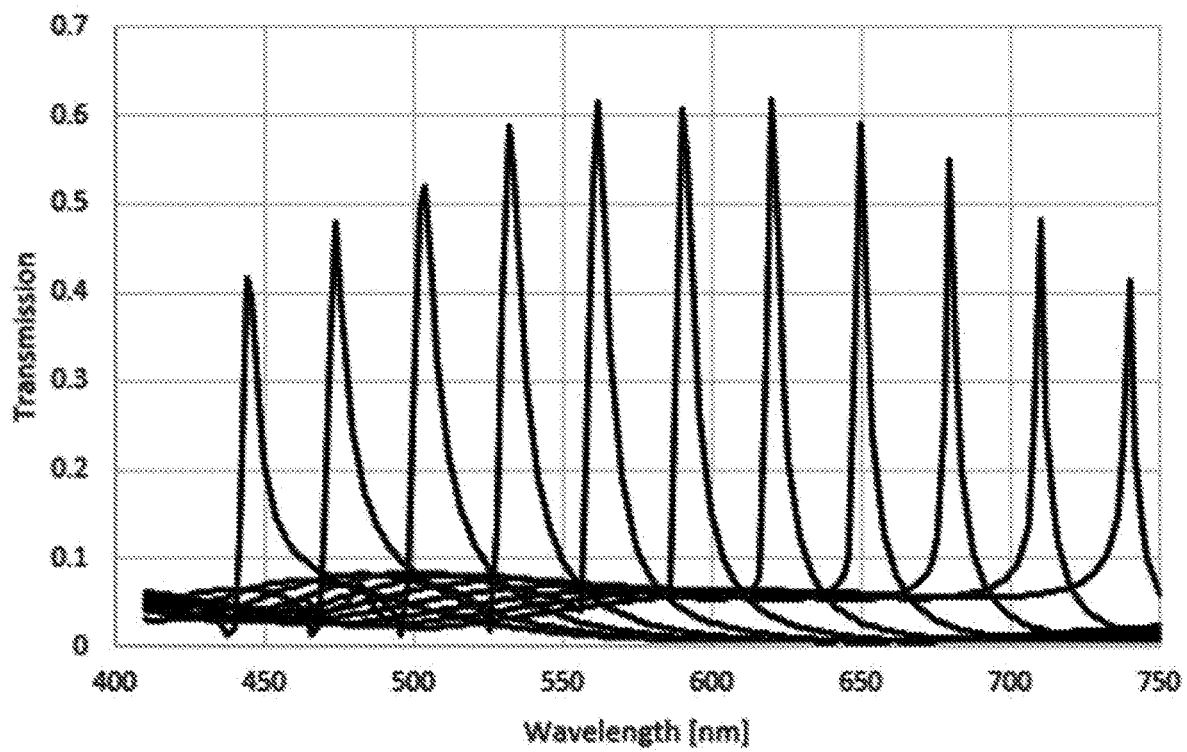
FIGS. 16-23 show simulation results of embodiments of the optical filter of the invention.
Figure 17:
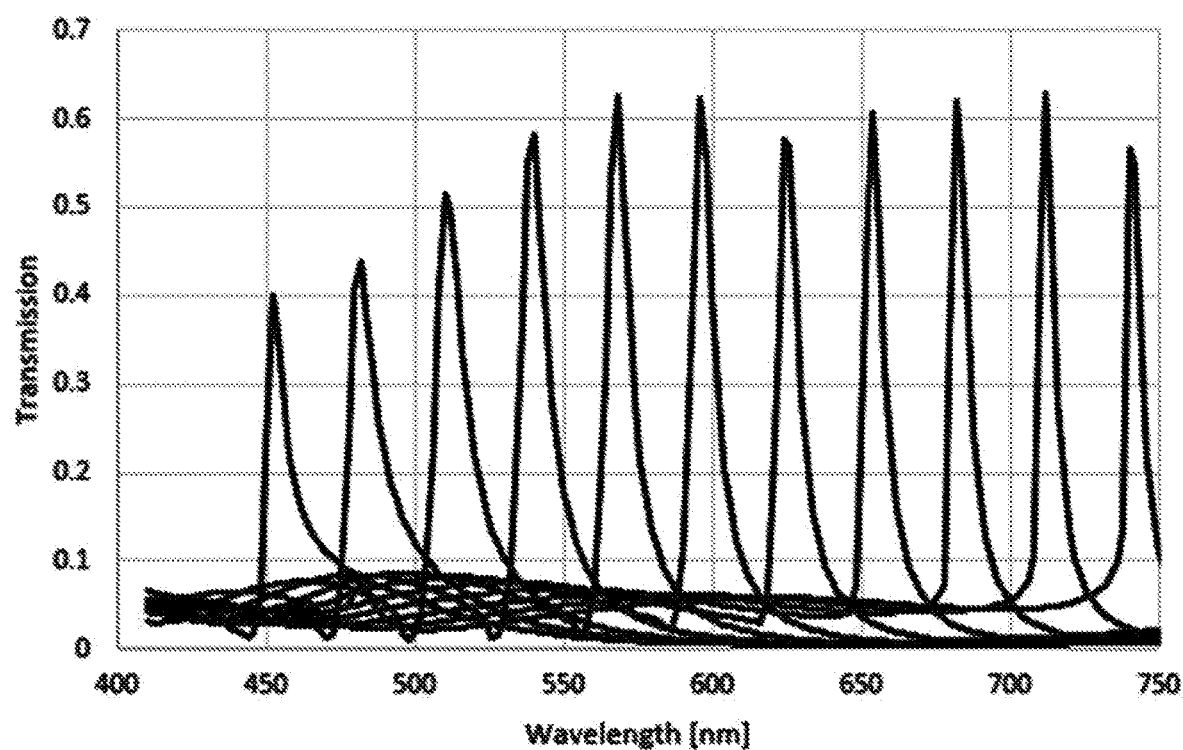

FIG. 17 shows simulation results of the same structure but with a waveguide thickness increased to 40 nm and a spacer thickness to 160 nm. Compared to FIG. 16, the relative contribution of the peak transmission from the different filters has been changed. In particular, the transmission of the filters at lowest wavelength has been decreased.

Figure 18:
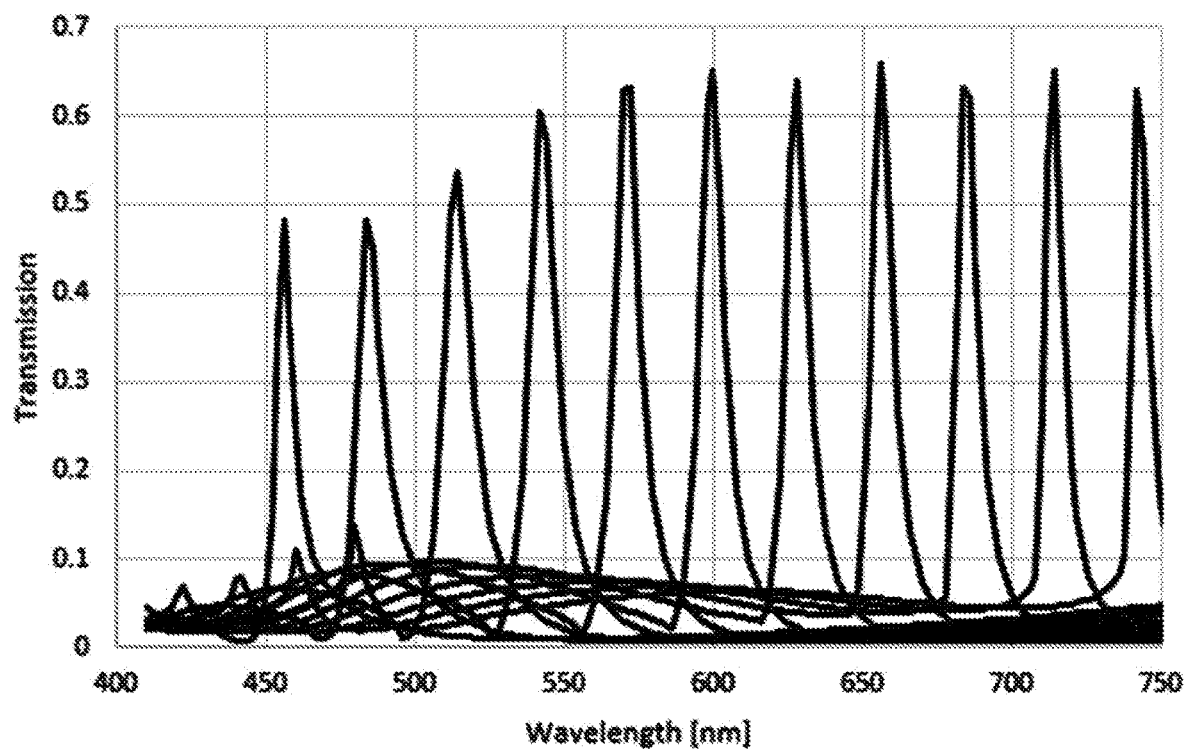

In FIG. 18, simulations results of a structure similar to FIG. 17 but with a waveguide thickness of 45 nm is shown. A higher balance between the different filter contributions is observed.

Figure 19:
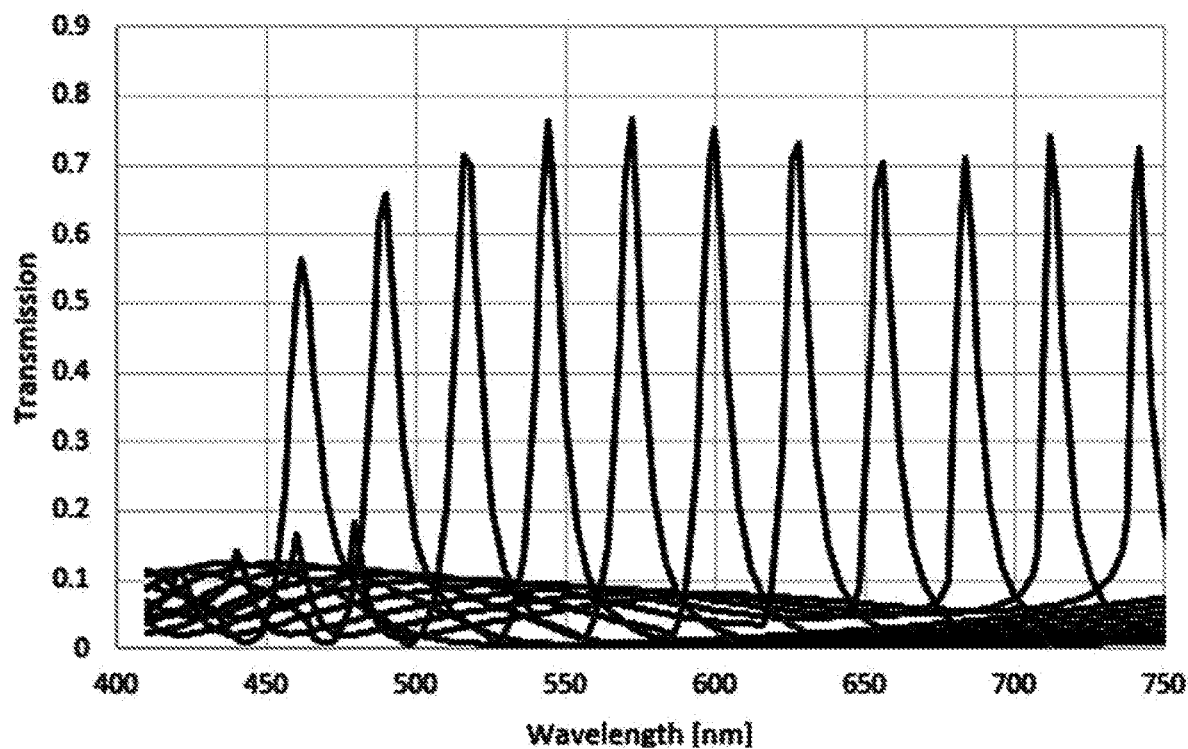

In FIG. 19, simulations results of a structure similar to FIG. 18 but with lower fill factor of F=0.7 are shown. The peak transmission is increased but the transmission outside the peak is also increased above 10%, which can introduce noise in the detection.

Figure 20:
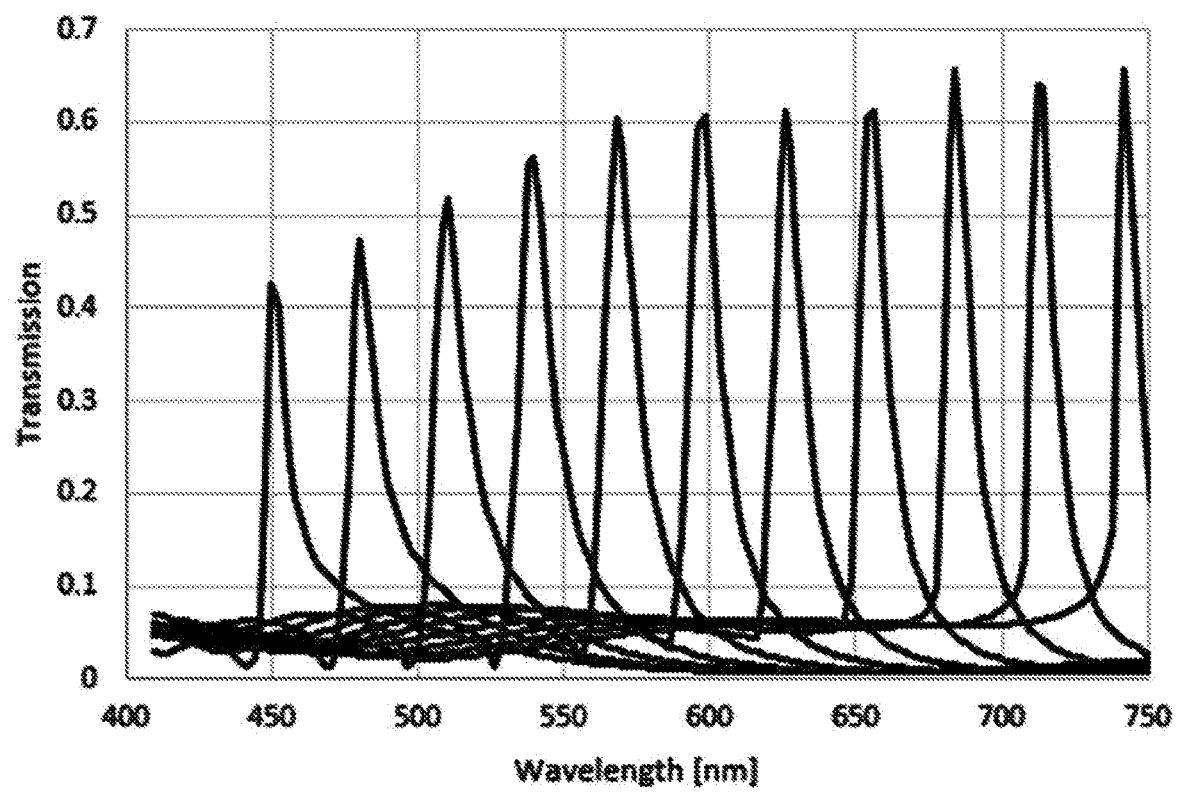

In FIG. 20, the refractive index of the cladding layer has been increased to 1.6 compared to the filter having the characteristics of FIG. 16. The field is pulled from the waveguide towards the metallic grating and as a result the losses increase and so does the filter bandwidth.

Figure 21:
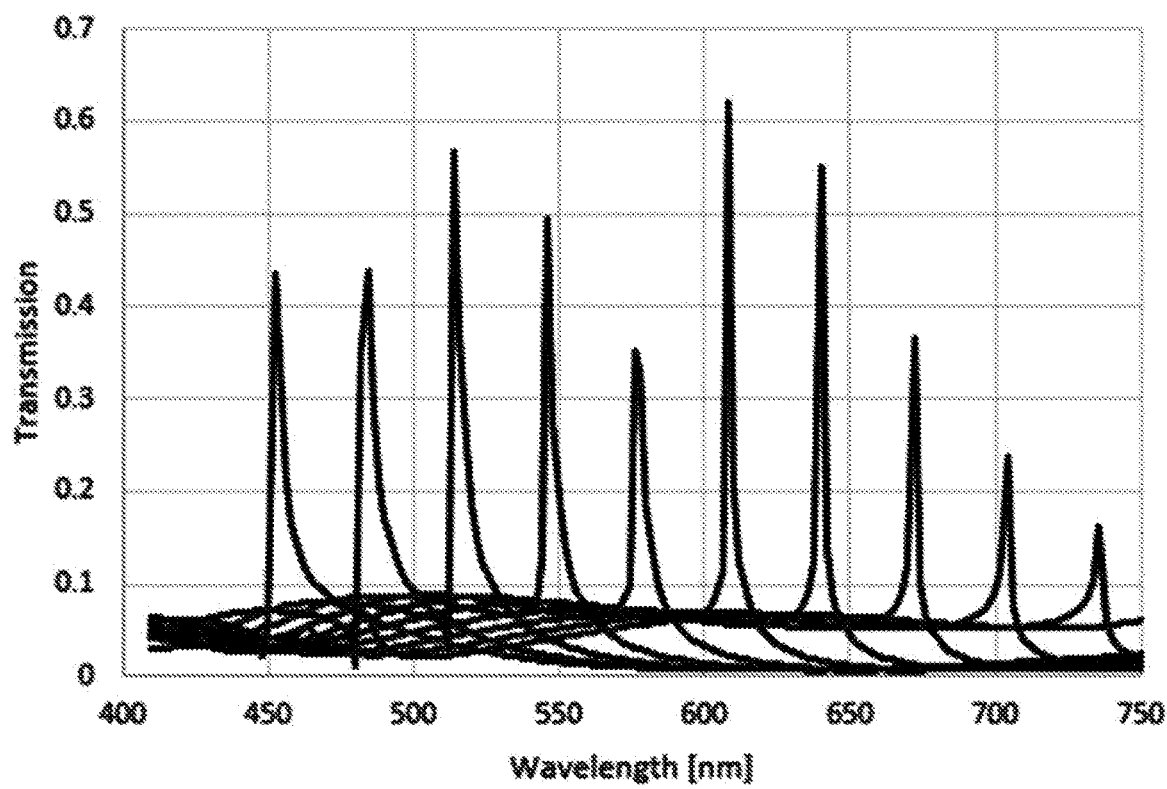

In FIG. 21, the refractive index of the substrate has been increased to 1.6 while the cladding is $SiO_2$. Compared to the filter having the characteristics of FIG. 14, the bandwidth is decreased because the field is pulled away from the metallic layer, reducing losses in the process. However, the interference process yielding the transmission peak is not anymore optimal and a low peak transmission is observed for some filters.

Figure 22:
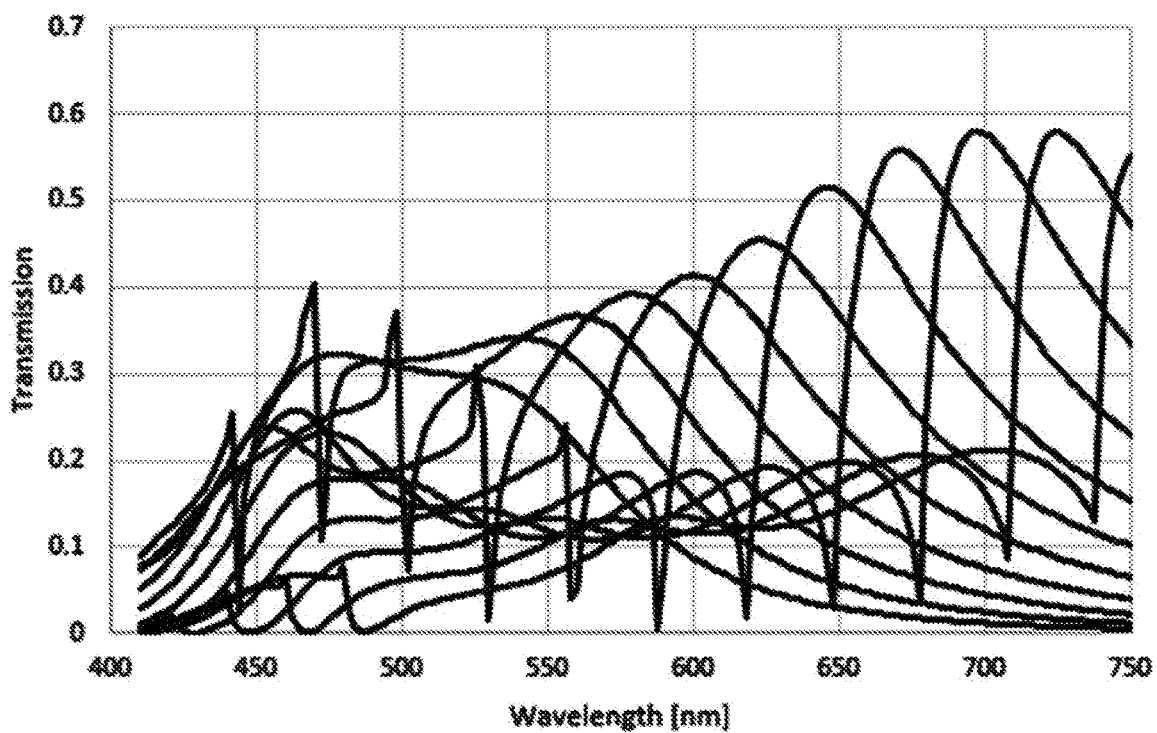

In another example the depth d' has been increased in 150 nm and the aluminum thickness $t_3$=40 nm, $t_4$=40 nm. Similar structures are disclosed for example in Ref. [3] for creating plasmonic filters. The results are shown in FIG. 22. In manufacturing, an angle of 45° of the metallic coating from the surface normal is estimated for this case.

It can be seen in FIG. 22 that the aspect ratio of the metallic grating leads to a strong contribution of plasmons to the resonance, and as an effect a strong broadening of the filter band. This shows the need for a grating with low modulation depth and that state-of-the-art plasmonic filters with oblique evaporation (such as in Ref. [3] or in US20140071532 from SVG Optronics) do not give the desired effect when combined with a resonant waveguide grating.

Another approach for the underlying structure is to use a sinusoidal profile, instead of binary. This is described in the following example. A sinusoidal profile can be originated with laser interference lithography. The fabrication process of the filter remains identical to the one illustrated FIG. 2a-2d, i.e. using nanoimprint lithography and thin film coatings. The self-shadowing effect is still present due to the corrugation of the underlying structure.

Figure 23:
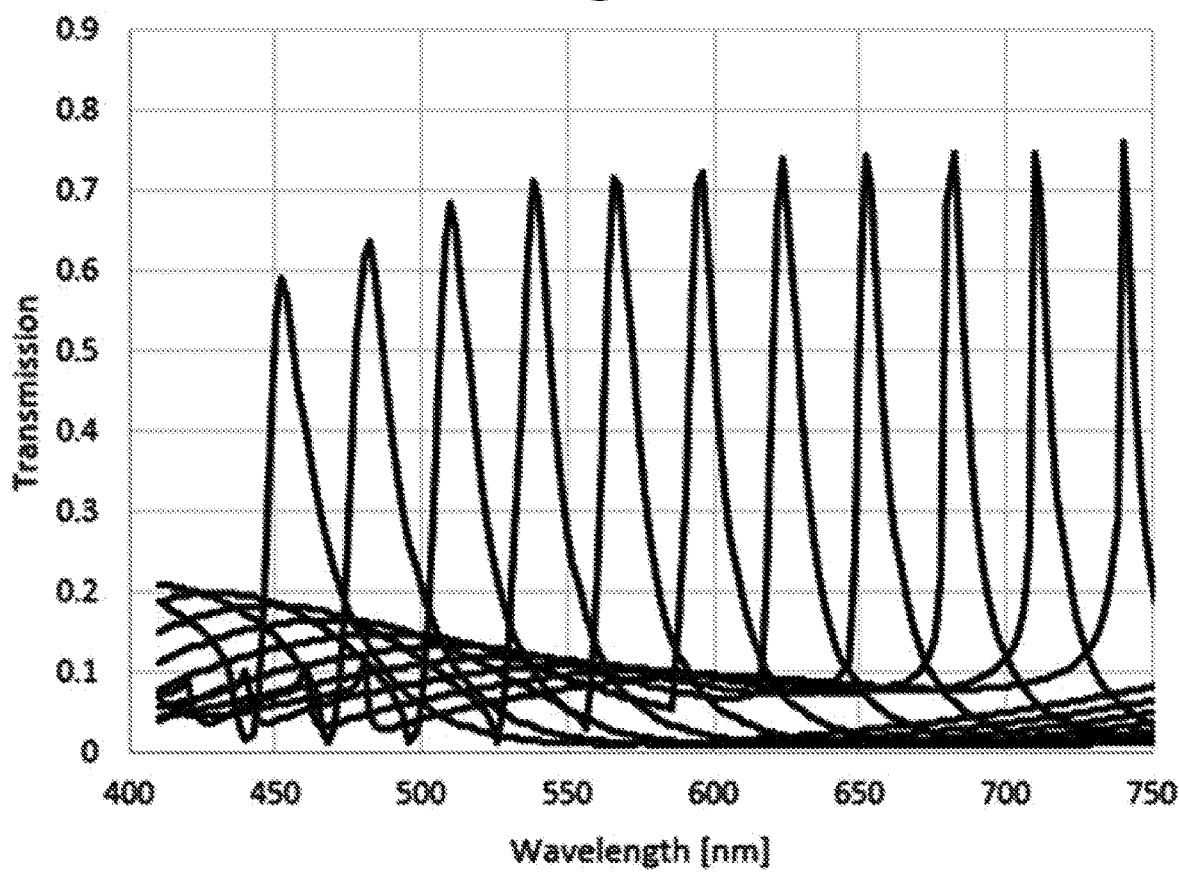

FIG. 23 shows the resulting simulation of the transmittance for filters with a sinusoidal profile. The substrate, the sol-gel and the cladding materials are modeled by the refractive index of $SiO_2$. The waveguide is made of $Si_3N_4$. The metallic coating is made of Al. The grating modulation depth d is 20 nm. The layer thicknesses are: $t_1$=60 nm, $t_2$=120 nm, $t_3$=20 nm, F=0.80. The pitch values are: 280, 300, 320, 340, 360, 380, 400, 420, 440, 460, 480 nm. Compared to FIG. 16, the filters bandwidth has been slightly increased and the background transmission increased up to 20%, but the manufacturability of the device is expected to be easier.

REFERENCES

[1] T. W. Ebbesen et al., "Extraordinary optical transmission through sub-wavelength hole arrays", Nature 391, 667 (1998);
[2] D. B. Mazulquim et al., Efficient band-pass color filters enabled by resonant modes and plasmons near the Rayleigh anomaly, Optics Express 30843, vol. 22, 30843 (2014);
[3] J. Wang et al., Ultra-thin plasmonic color filters incorporating free-standing resonant membrane waveguides with high transmission efficiency, Applied Physics Letters vol. 110, 031110 (2017);
[4] F. Lütolf et al., Fano-resonant aluminum and gold nanostructures created with a tunable, up-scalable process, Nanoscale vol. 7, 18179 (2015).

What is claimed is:

1. An optical transmission filter, configured to transmit a portion of the spectrum of a light beam incident on said filter, comprising a substrate having a first substrate surface and a second substrate surface opposite to said first substrate surface, and comprising a nanostructured metallic layer and a waveguide, wherein—said first substrate surface is a patterned surface comprising an array of nanostructures consisting of adjacent ridges and grooves;
  a high refractive index dielectric waveguide is arranged on said first substrate surface and has a patterned shape defined by said first substrate surface, said dielectric waveguide having a refractive index n1 between 1.45 and 3.3; —a low index dielectric layer is arranged on top of said dielectric waveguide and has a patterned shape defined by said dielectric waveguide, said patterned shape defining adjacent ridges and grooves, said dielectric layer having a refractive index n2 between 1.15 and 1.7, n2 being lower than n1; —an array of metallic nanostructures is arranged on at least a portion of said low index dielectric layer and having, at least partially, a patterned shape defined by said dielectric waveguide.

2. The optical transmission filter according to claim 1 wherein said array of metallic nanostructures comprises an array of through-apertures, each of said apertures facing one of the grooves of said low index dielectric layer.

3. The optical transmission filter according to claim 1 wherein said array of metallic nanostructures has a non-uniform thickness and has a thickness $t_3$ of the metallic nanostructures on the ridges of said low index dielectric layer, greater than its thickness $t_5$ on the grooves of said low index dielectric layer.

4. The optical transmission filter according to claim 1 wherein said array comprises a plurality of N subarrays having different periodicities $P_1$-$P_N$ in at least one dimension.

5. The optical transmission filter according to claim 1 wherein said metallic nanostructures only covers at least a portion of the ridges of said low index dielectric layer.

6. The optical transmission filter according to claim 1 wherein said metallic nanostructures only cover at least a portion said grooves.

7. The optical transmission filter according to claim 1 wherein the thickness $t_2$ of said dielectric waveguide is between 20 nm and 150 nm.

8. The optical transmission filter according to claim 1 wherein the thickness $t_2$ of said low index dielectric layer is between 10 nm and 200 nm.

9. The optical transmission filter according to claim 1 wherein the period of said array of metallic nanostructures is between 200 nm and 500 nm.

10. The optical transmission filter according to claim 1 wherein said array of metallic nanostructures is a linear array of nanometer sized lamellas.

11. The optical transmission filter according to claim 1 wherein said first substrate surface is a binary patterned surface.

12. The optical transmission filter according to claim 1 wherein said first substrate surface is a sinusoidal patterned surface.

13. An optical filter system comprising the optical transmission filter according to claim 1 wherein a detector array is fixed to said substrate.

14. A spectrometer comprising at least one said optical filter system according to claim 13, said spectrometer having a spectral resolution of lower than 30 nm for incident light having a wavelength between 300 nm and 790 nm.

15. A method of fabrication of an optical transmission filter according to claim 1, the method comprising the following steps a-g:
  a) providing a substrate having a contact surface;
  b) providing a mold master comprising a nanostructured surface;
  c) applying on said contact surface a layer of sol-gel;
  d) realizing a nanoimprinted layer of said sol-gel layer by using UV light illumination of said layer of sol-gel;
  e) depositing a high refractive index thin film coating on said nano-imprinted layer;
  f) depositing a low refractive index thin film coating on said high refractive index thin film coating;
  g) depositing, by oblique coating, on said low refractive index thin film coating a metallic coating.

16. The optical transmission filter according to claim 1 wherein said array comprises a plurality of N subarrays having different periodicities $P_1$-$P_N$ in at least one dimension, N being greater than 10.

17. The optical transmission filter according to claim 1 wherein the thickness $t_2$ of said dielectric waveguide is between 30 nm and 100 nm.

18. The optical transmission filter according to claim 1 wherein the thickness $t_2$ of said low index dielectric layer is between 30 nm and 200 nm.

19. A spectrometer comprising at least one optical transmission filter according to claim 1, said spectrometer having a spectral resolution of lower than 30 nm for incident light having a wavelength between 300 nm and 790 nm.

20. A spectrometer comprising at least one optical transmission filter according to claim 1, said spectrometer having a spectral resolution of lower than 20 nm for incident light having a wavelength between 300 nm and 790 nm.

* * * * *